United States Patent [19]

Danielson et al.

[11] Patent Number: 4,972,463
[45] Date of Patent: Nov. 20, 1990

[54] IN-STORE MULTIPLE DEVICE COMMUNICATIONS UNIT AND CENTRALIZED DATA SYSTEM UTILIZING SAME

[75] Inventors: Arvin D. Danielson, Cedar Rapids; Joseph J. Kubler, Nederland; Dennis A. Durbin, Cedar Rapids; Michael D. Morris, Cedar Rapids; Keith K. Cargin, Jr., Cedar Rapids, all of Iowa

[73] Assignee: Norand Corporation, Cedar Rapids, Iowa

[21] Appl. No.: 907,496

[22] Filed: Sep. 15, 1986

[51] Int. Cl.$^5$ .......................................... H04M 11/00
[52] U.S. Cl. ........................................ 379/91; 379/93; 379/106; 379/144; 235/381; 364/132; 364/408; 370/3; 455/601
[58] Field of Search ................. 379/91, 93, 96, 106, 379/107, 144; 235/381; 364/132, 138, 408; 370/3; 455/601

[56] References Cited

U.S. PATENT DOCUMENTS

| | | | |
|---|---|---|---|
| 3,596,256 | 7/1971 | Alpert et al. | 379/93 |
| 3,821,705 | 6/1974 | Chertok et al. | 379/91 |
| 3,868,640 | 2/1975 | Binnie et al. | 379/93 |
| 4,187,404 | 2/1980 | Deman et al. | 379/93 |
| 4,286,118 | 8/1981 | Mehaffey et al. | 379/267 |
| 4,331,974 | 5/1982 | Cogswell et al. | 358/84 |
| 4,399,563 | 8/1983 | Greenberg | 455/607 |
| 4,439,636 | 3/1984 | Newkirk et al. | 379/91 |
| 4,622,685 | 11/1986 | Dhawan et al. | 375/8 |
| 4,631,357 | 12/1986 | Grunig | 379/106 |
| 4,654,869 | 3/1987 | Smith et al. | 379/93 |
| 4,688,170 | 8/1987 | Waite et al. | 379/98 |
| 4,689,478 | 8/1987 | Hale et al. | 379/97 |
| 4,752,950 | 6/1988 | Le Carpentier | 379/106 |

*Primary Examiner*—Jin F. Ng
*Assistant Examiner*—Wing Fu Chan
*Attorney, Agent, or Firm*—Neuman, Williams, Anderson & Olson

[57] ABSTRACT

In a store data communications system, multiple data sources having disparate communications standards are connected with respective device interfaces of a multiple device communications controller unit. Multiple protocol controllers are coupled with the respective device interfaces and convert the data from each to a common protocol for transmission via a single telephone line. The interface units preferably can be customized to operate with various data sources, a fiber optic coupler, or a modem, or another controller unit for convenient expansion. The device interfaces preferably have snap-in assembly with the controller unit so that device interfaces customized to different standards can be inserted or replaced at any interface receptacle, the multiple protocol controllers preferably being capable of corresponding re-programming by downloading from a remote station preferably via one of the device interfaces.

20 Claims, 31 Drawing Sheets

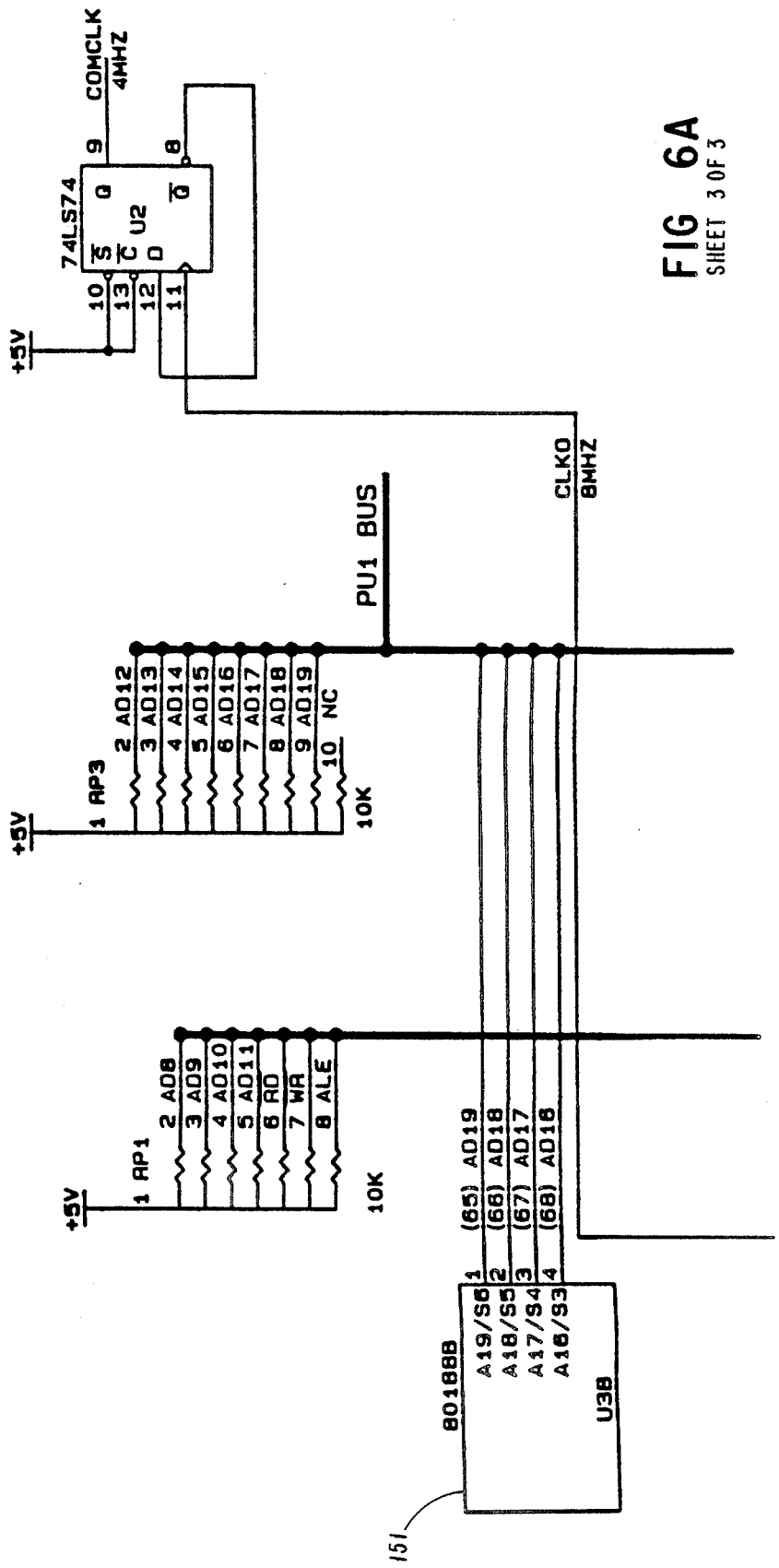

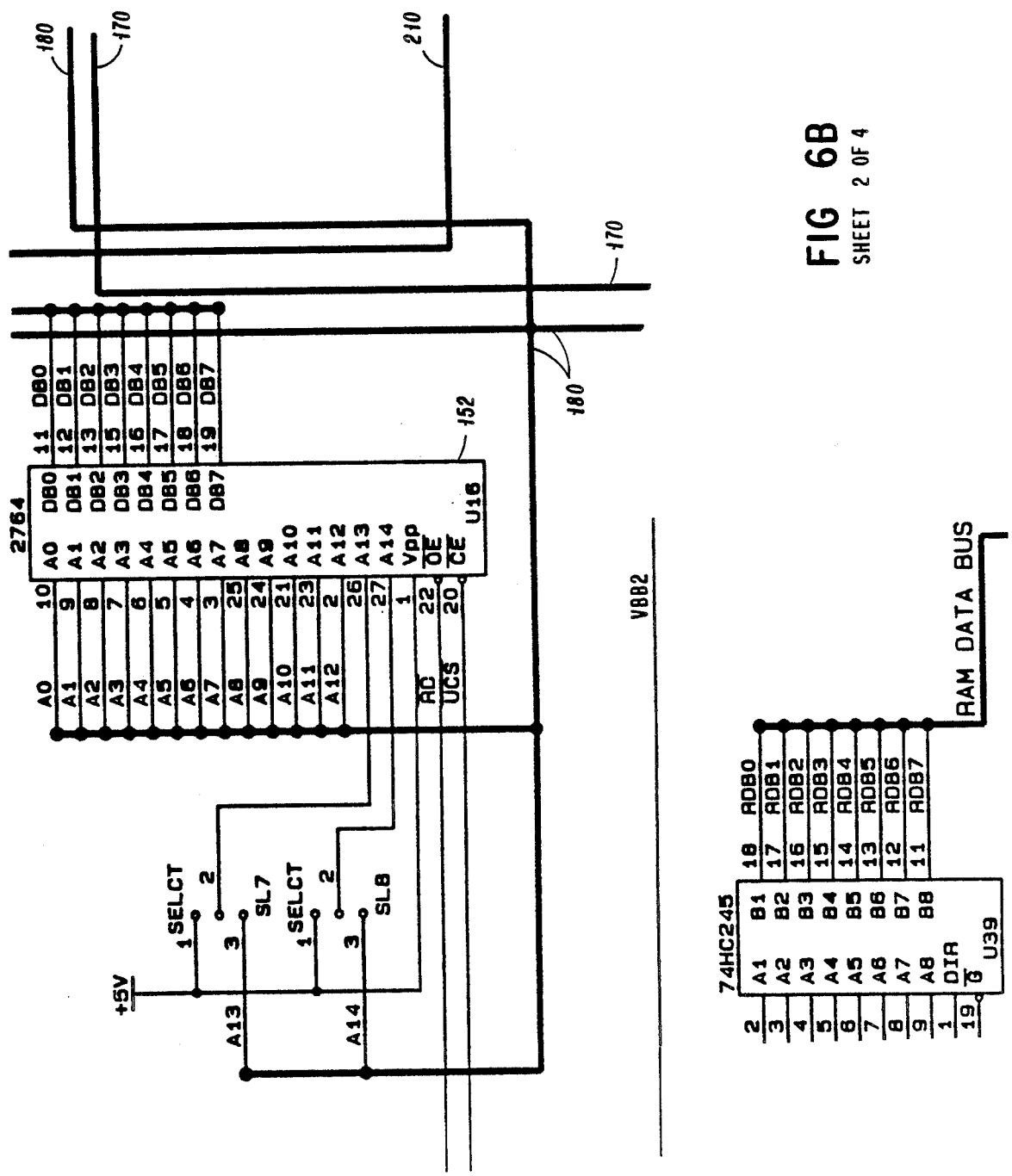
FIG 6B SHEET 2 OF 4

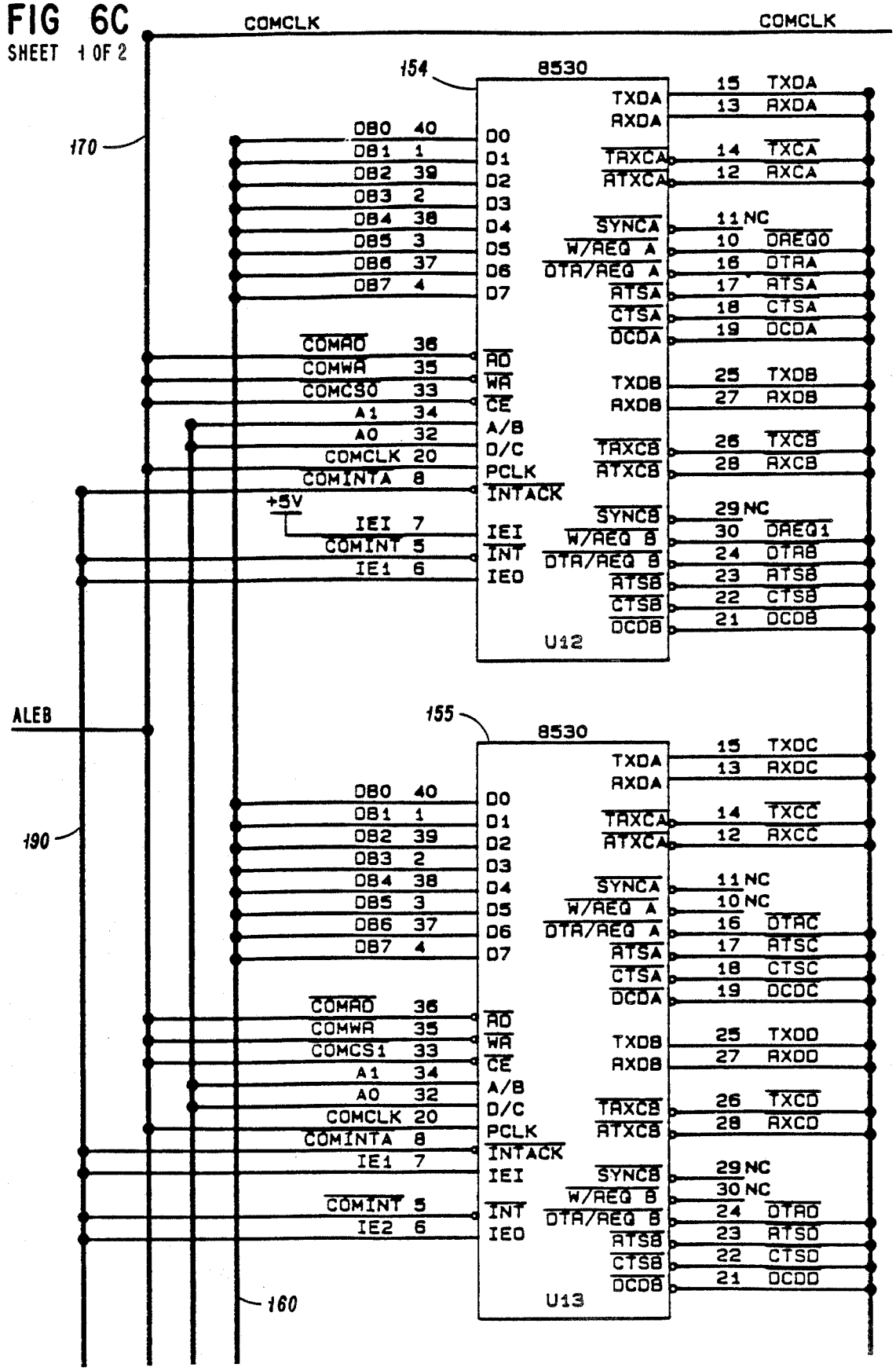

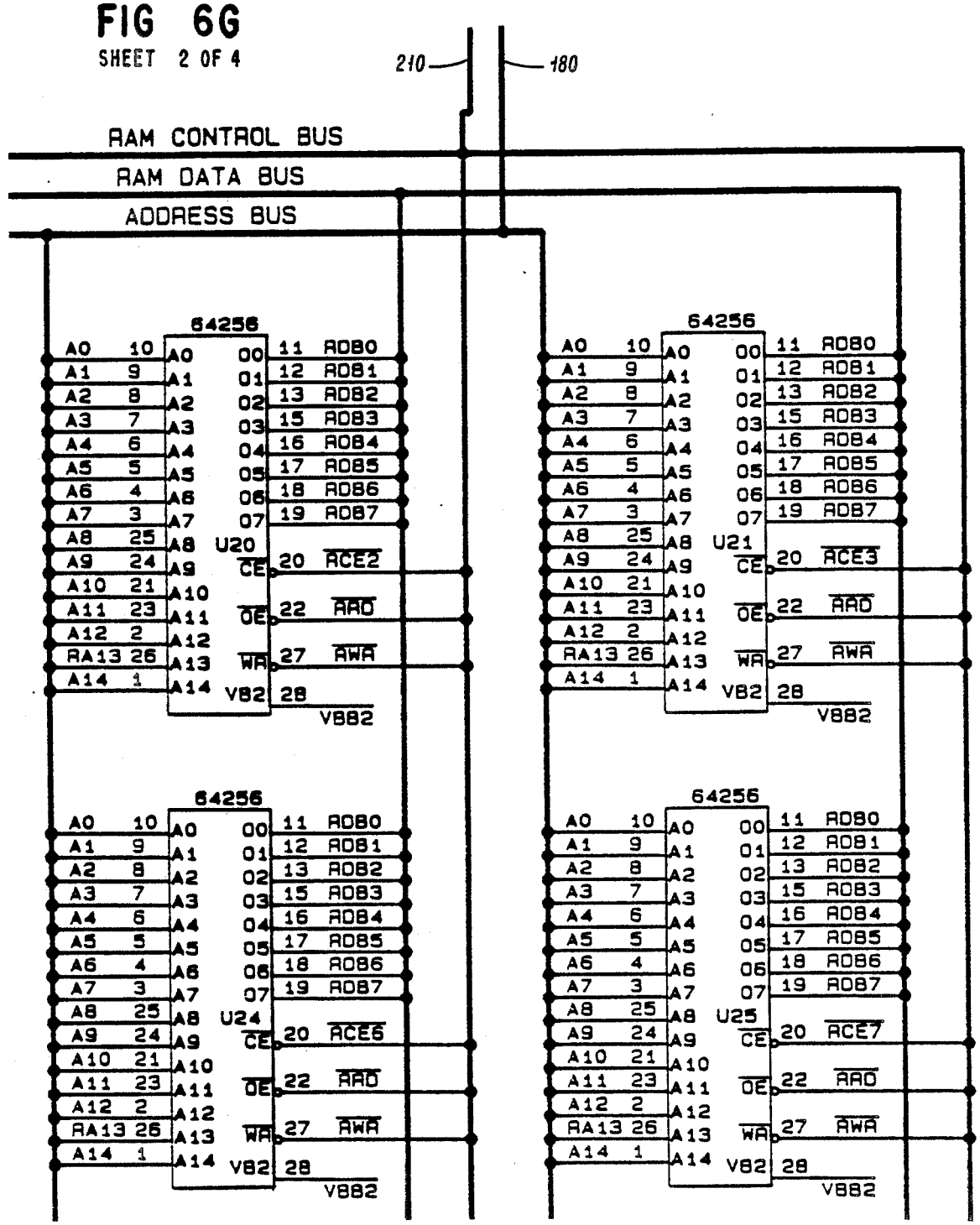

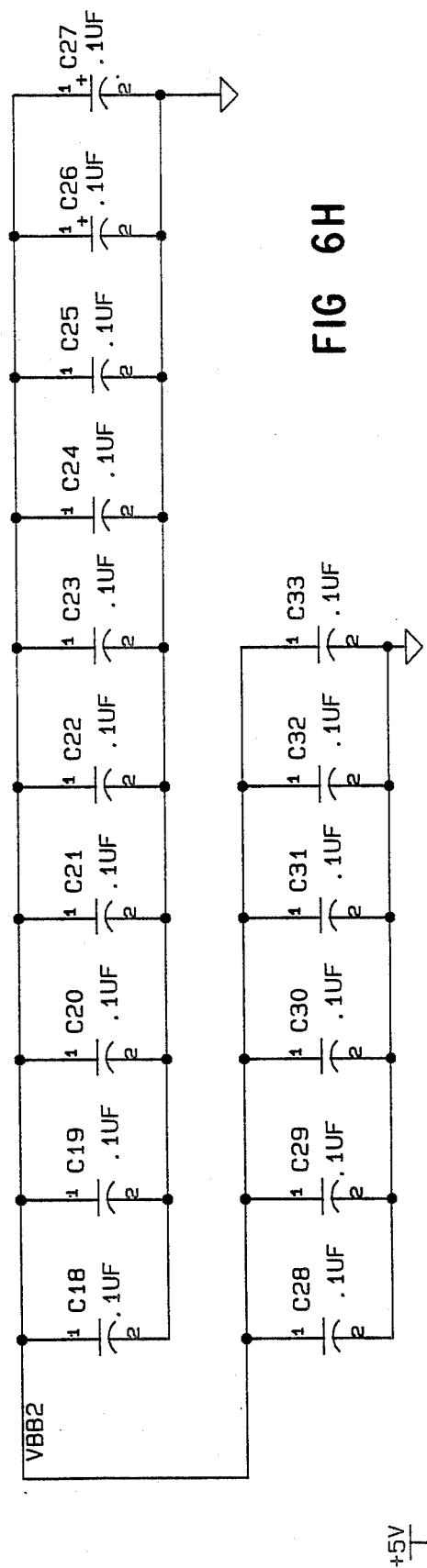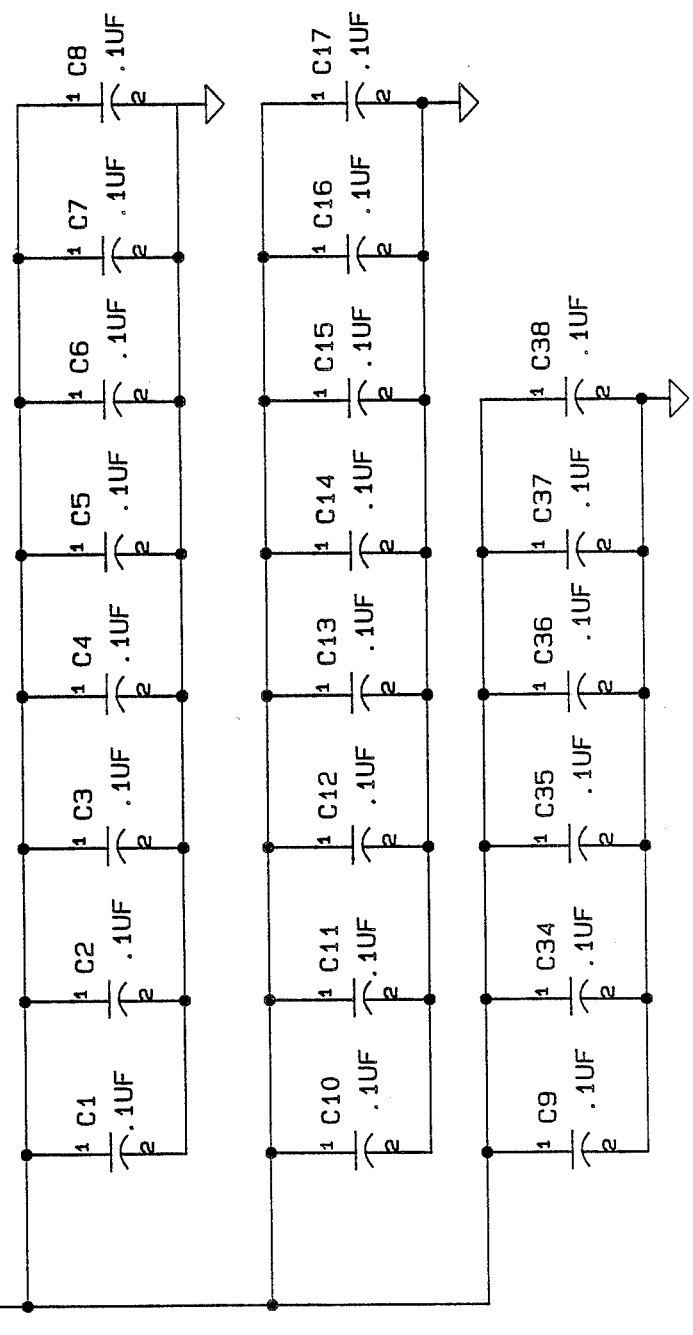
FIG 6H
FIG 6I

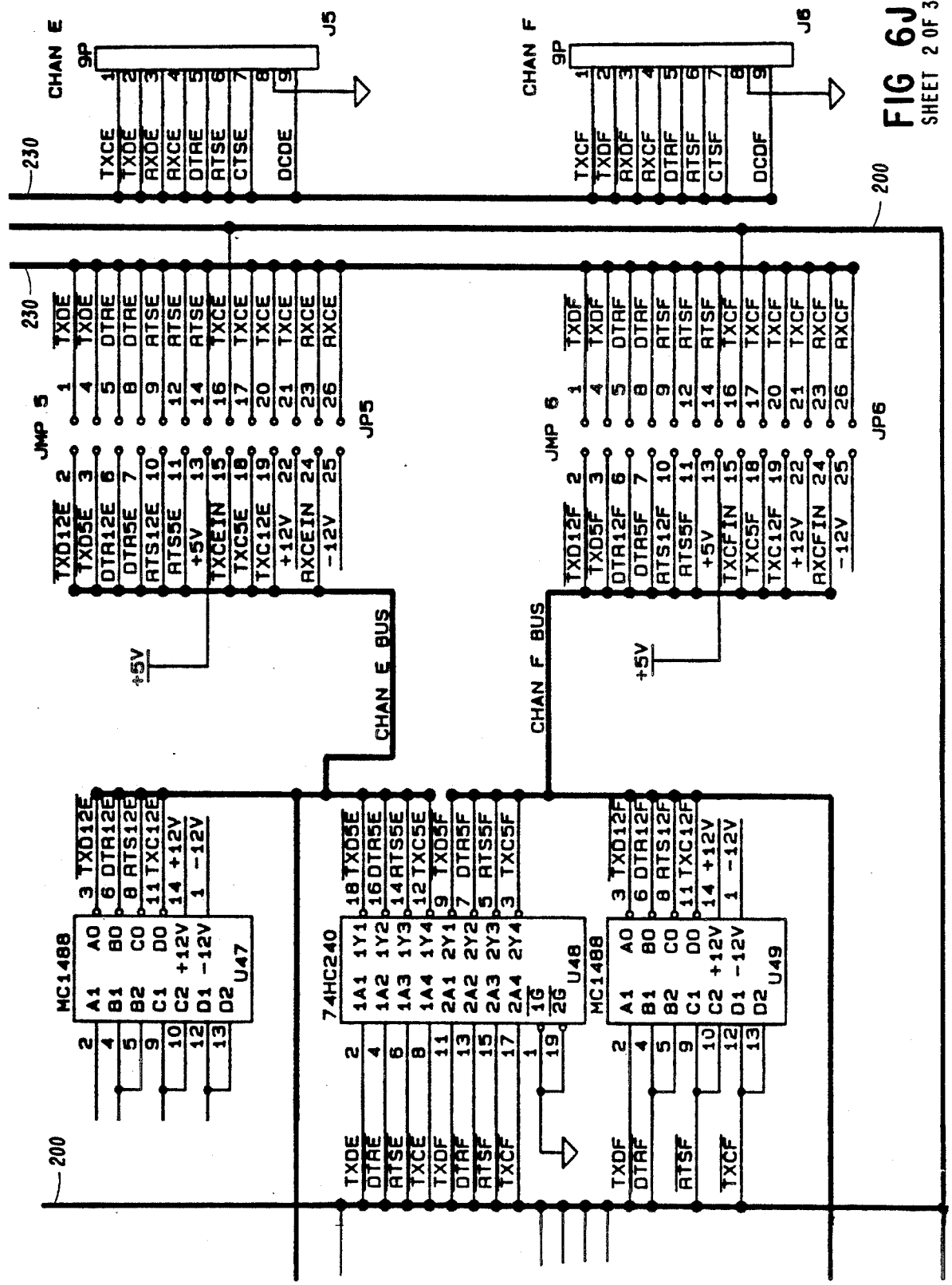

IN-STORE MULTIPLE DEVICE COMMUNICATIONS UNIT AND CENTRALIZED DATA SYSTEM UTILIZING SAME

BACKGROUND OF THE INVENTION

In a so-called convenience store more and more devices requiring data communication with a remote processing means have proved to be economically justified. Examples of such devices are the following:

Auomatic Teller Machine (ATM)
Credit/Debit Authorization Terminal
Point of Sale Terminal
Gasoline Tank Gauging Device
Gasoline Pump-Island Terminal
Ticket Vending Console
Security System Device
Video Rental Console Where there are a large number of store locations under a common management in a given region, it would be highly desirable if each store could be linked to a central site via a single telephone line, and if the central site could in turn distribute the incoming data to the respective remote processing means such as a corporate network, a credit/ debit network and a centralized center for check verification, video rental system processing, and the like.

SUMMARY OF THE INVENTION

It is therefore an object of the present invention to provide an in-store communications unit capable of accepting data from a number of devices such as an ATM terminal, a credit/debit terminal, a point of sale terminal, and the like, and of assembling the data in a compact format for transmission via a single communications line to a remote processing station.

Another object of the invention is to provide a data collection system for a group of stores wherein for a given store a plurality of communications units can be linked to a single communications line to readily increase the number of in-store devices coupled to the single communications line.

A further object of the invention resides in the provision of a highly economical centralized data system which can be simply installed in existing stores without major modifications, and which is readily expanded as required.

In one aspect of the presently claimed invention, multiple different types of devices (examples of different types of devices being an automatic teller, a credit/-debit authorization terminal, a point of sale terminal, a fuel volume sensing device, and a video rental terminal) are coupled with remote processing means via a single communications line, a multiple device communications unit for such purpose having respective device interface means for local coupling with respective ones of the multiple different types of devices, device interface buffer memory means storing device data from each of the devices, and main channel interface means being coupled with each of the device interface means and the device interface buffer memory means for assembling data from each of the device interface buffer memory means and for transmitting the assembled data utilizing a common protocol via a single communications line to a remote processing means.

In another aspect of the presently claimed invention, a central station has coupling means for coupling with one or more processing systems such as a corporate network and/or a credit/debit network, and/or a local processing system, and has a plurality of central communications port means, a plurality of multiple device communications units each communicating with one of the central communications port means via a single communications channel, and each of the multiple device communications units being located at a separate location and having respective device interface units customized to communicate with respective disparate data sources at the separate location.

In a further aspect of the presently claimed invention, a multiple device communications controller unit has a series of device interfaces each capable of coupling with a data source, and main channel means has memory means storing data for each of the device interfaces, with programmable multiple protocol controller means assembling data from the memory means substantially as it arrives from said device interfaces, and transmitting assembled data via a single telephone line to a remote station, the multiple protocol controller means being programmable to accommodate device interfaces operating with a plurality of different communications standards.

Other objects, features and advantages of the present invention will be apparent from the following detailed description taken in connection with the accompanying sheets of drawings, and from the relationships and individual features of the appended claims.

BRIEF DESCRIPTION OF THE DRAWINGS

FIG. 6H showing capacitance means associated with a line VBB2, FIGS. 6B and 6D;

FIG. 6I showing capacitance means associated with the plus five volt supply (+5 V);

DETAILED DESCRIPTION

Figure 1:
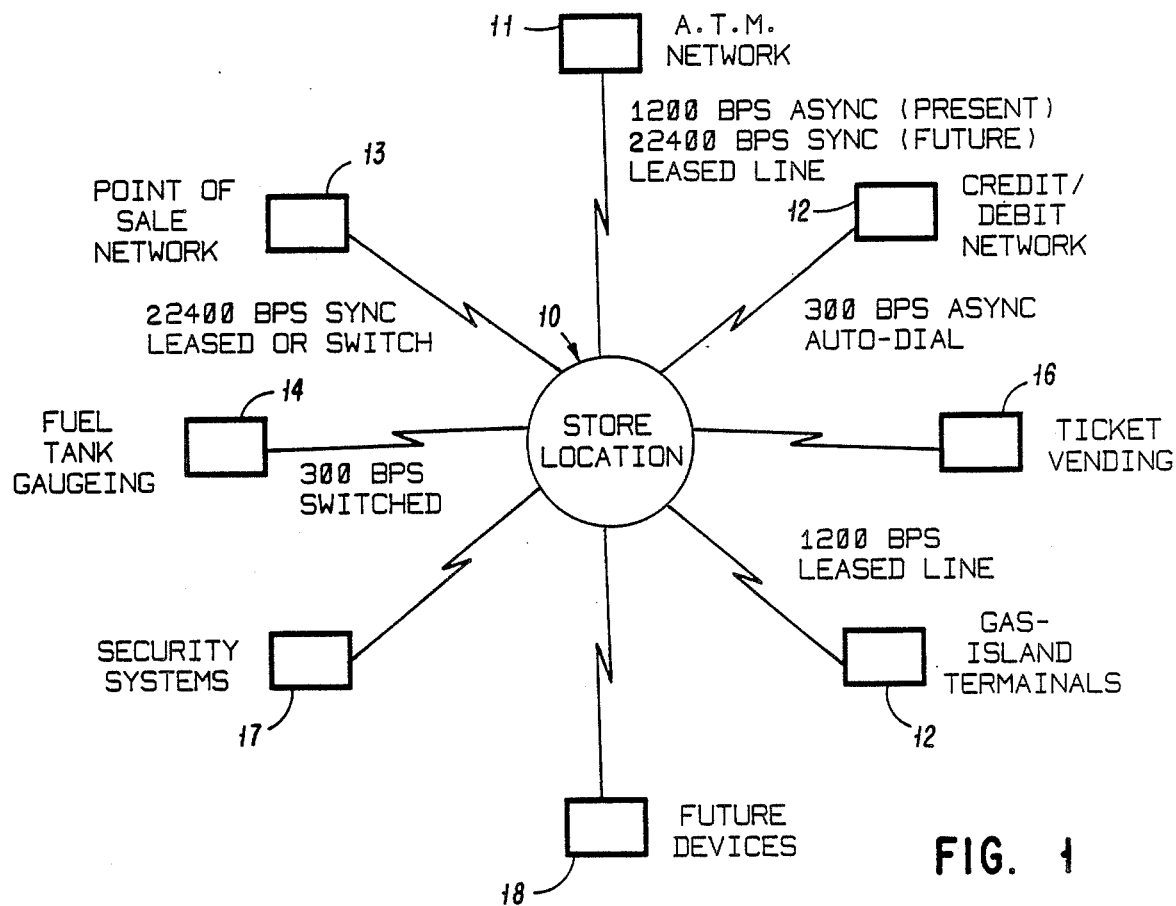
FIG. 1 is a diagrammatic illustration presented as a basis for explaining the background of the present invention, and indicating the various device systems having disparate communications parameters which may need to be incorporated at an individual store location.
Figure 2:
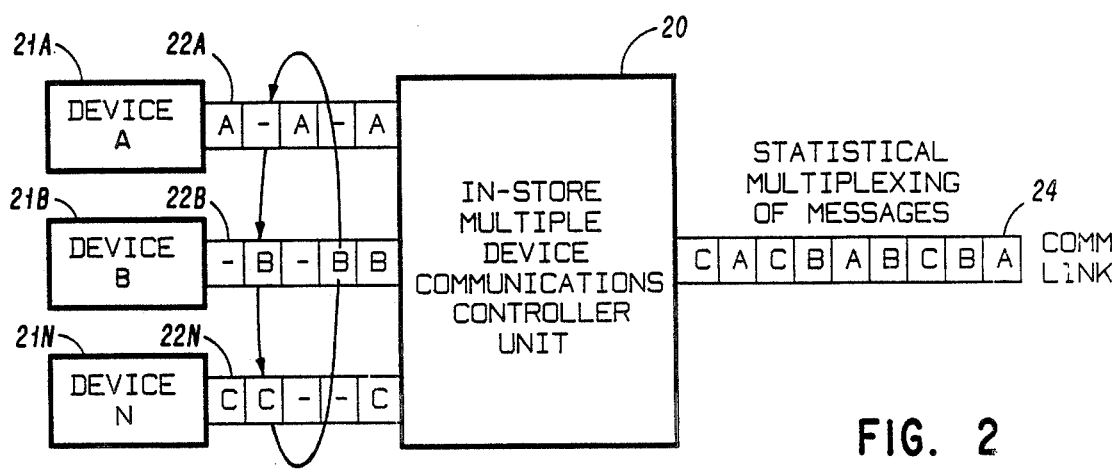
FIG. 2 is a diagrammatic illustration useful for explaining an embodiment in accordance with the present invention.

Devices such as tank gauging systems, video rental systems, credit/debit systems, ticket vending systems, gasoline island credit terminals, etc. are being installed in stores because of the economic pay-back realized. The benefits of these devices directly rely on the ability to communicate data from the store location. The various devices are linked to respective different remote processing means, for example, an A.T.M. network 11, FIG. 1, a credit/debit network 12 and a point of sale network 13. Such networks commonly have different phone line installations. For example, an A.T.M. device may be linked with the A.T.M. network 11 via a leased line and may involve data transmission at 1200 bits per second, asynchronous, with a planned transmission at at least 2400 bits per second, synchronous. A credit/debit authorization terminal of store location 10 may communicate with the credit/debit network 12 by means of an automatic dialing system with transmission at 300 bits per second, asynchronous. A point of sale terminal of store location 10 may communicate with a point of sale network via leased or switched phone lines at a data transmision rate of at least 2400 bits per second, synchronous. A tank gauging device of store location 10 may transmit data at 300 bits per second via a switched phone line while a gas-island terminal of store location 10 may transmit data at 1200 bits per second via a leased line. Other devices of store location 10 may form part of a ticket vending system 16, a security system associated with component 17 and future devices such as a video rental console of store location 10 associated with a video rental system. The varied requirements of the different systems such as 11-18 of FIG. 1 has created a costly problem. It would be highly desirable if a group of stores in a given region could be connected in a network configuration such that the data from the devices of an individual store could be transmitted via a single phone line to a central site. Some of the problems involved in establishing such a network are as follows:

Incompatible communications
  synchronous vs. asynchronous
  bit rate
  leased vs. dial-up
  protocol
Non-standard devices with diverse functions
Multiple hosts (end points for data)
Number and type of devices differ by store location
Number of devices will increase as more in-store services are provided An extremely desirable solution to the problem would be to provide an in-store multiple device communications unit such as indicated at 20 in FIG. 2 which could be coupled with the individual devices such as 21A, 21B, ..., 21N and receive data from the respective devices at random times via respective communications links adapted to the respective devices such as indicated at 22A, 22B, ..., 22N. In the diagrammatic example of FIG. 2, the communications channels 22A-22N are indicated as having five time slots with data being transmitted from devices 21A, 21N in the first time slot, data being transmitted from devices 21B, 21N in the second time slot, data being transmitted from device 21A in the third time slot, data being transmitted from device 21B in the fourth time slot, and data being transmitted from all devices in the fifth time slot. According to FIG. 2, unit 20 would assemble all of the data from the devices taking account of any desired high priority devices, and send out the data via a single communications link 24. Simply by way of example, the data C in the first time slot of channel 22N could be transmitted during a first time slot of channel 24, while the data A of channel 22A in the first time slot could be transmitted via link 24 in a second time slot and so on. Since the devices 21A-21N of the various systems 11-18 of FIG. 1 all transmit data intermittently, it should be apparent that the use of a single communications link 24 to transmit all of the data can result in great communication efficiency as well as markedly reduced communications line costs for a group of stores. In the embodiment of FIG. 2, it will be noted that the time slots of communications link 24 are not fixedly assigned to the respective devices 21A-21N, in general the data from the respective devices being transmitted based on the time of receipt of the data by the communications unit 20. Such statistical multiplexing of device messages allows for many more devices to be handled than with traditional fixed time slot time division multiplexing.

Figure 3:
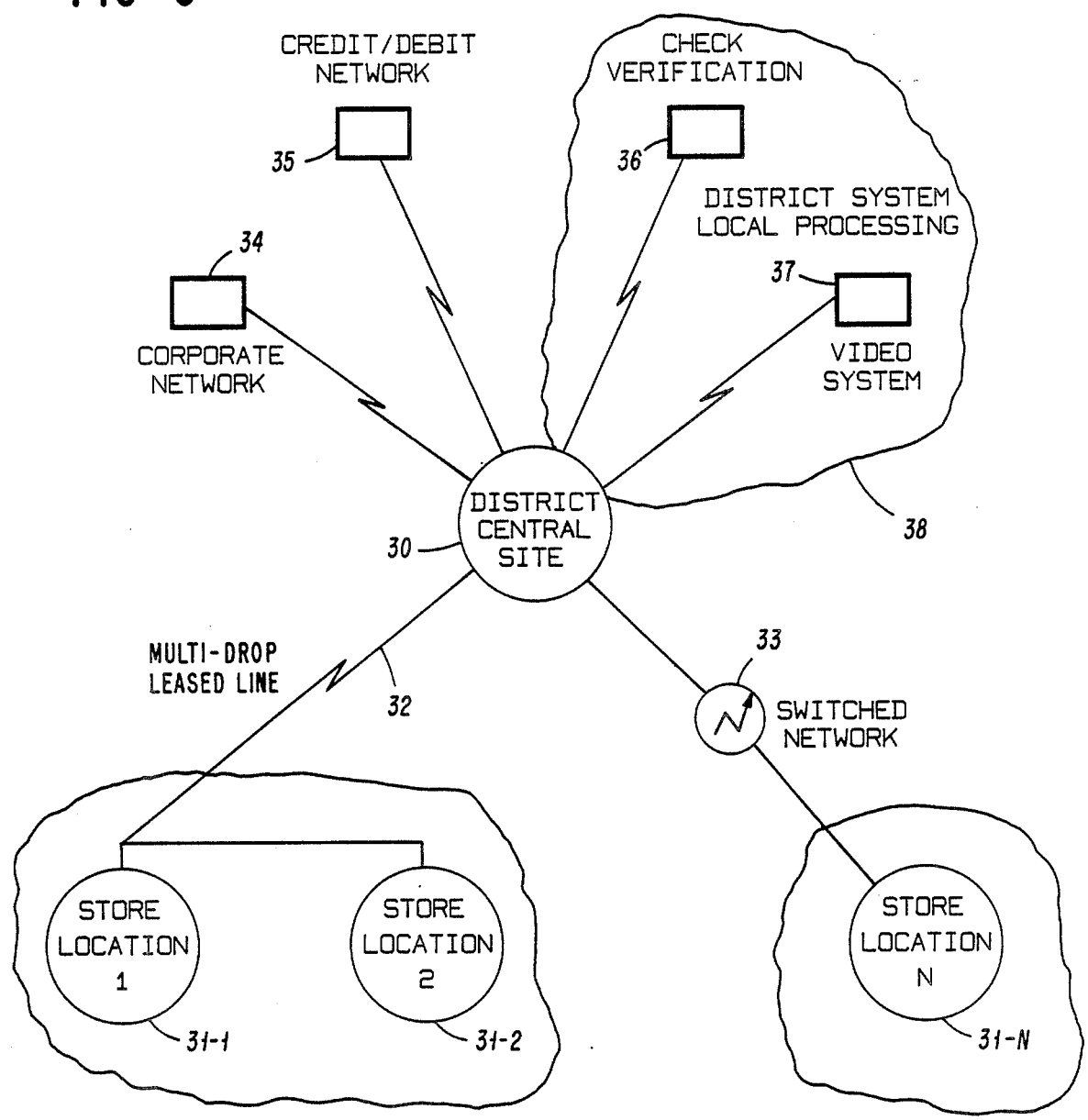
FIG. 3 illustrates a centralized data collection system utilizing the embodiment of FIG. 2.

The increased efficiency can be achieved because of the fact that not all attached devices are active simultaneously. Efficiencies of better than a four to one ratio are achievable with an embodiment as represented in FIG. 2 depending on the type and amount of activity from the devices. The single communications link 24 can be a voicegrade switched line or a multi-drop leased line, depending on economics. The data can then be de-multiplexed at the central site, e.g. as represented at 30 in FIG. 3. By way of example, FIG. 3 illustrates stores 31-1 and 31-2 communicating with the central site 30 via a multi-drop leased line 32 and a further store location 31-N coupled with the central site 30 via a switched network as represented at 33. The data from all of the e.g. N store locations of a given region may thus arrive at central site 30 and be distributed to the respective remote processing means such as represented by a corporate network 34, a credit/ debit network 35, and a check verification system 36 and a video system 37, for example, forming part of a local processing system 38 for the central site 30.

In the embodiment of FIGS. 2 and 3, central site 30 communicates with the store locations using a standard protocol. The data sent from the stores is examined for routing information and switched or distributed to the respective host application processors such as 34-37. This is very efficient because many of the applications programs ideally reside locally at the district site 30 as represented by processing means 36 and 37 in FIG. 3. The information that does not need to go out of the central site can be multiplexed to a high speed circuit connected to the respective processing means such as 36 and 37 for cost savings. As another example, the credit/debit network 35 may be located at the central site 30. In many applications, the computer of the credit/debit network 35 can be in relatively close physical proximity to the central site 30.

As will be explained hereafter, to relieve the host computer of various communication tasks, a distributed processor may be installed at the central site 30 between the host computer and the communications links to the stores such as indicated at 32 and 33 in FIG. 3. This distributed processor at the central site 30 can handle many of the communications tasks and application tasks totally transparent to the host system or with minimum involvement thereof. Such a communications processor at the central site 30 may poll the store locations requesting data from each of the respective communications units 20, FIG. 2, in a predetermined manner and then may route the information to the respective endpoints such as represented at 34-37 in FIG. 3.

At each of the store locations such as 31-1 to 31-N, a communications unit such as 20, FIG. 2, controls the flow of data to and from the devices such as 21A-21N, buffers the data until the communication channel such as 24 is ready, and then responds to the distributed processor poll from the central site 30 by sending the device information. The device information is packaged in a standard protocol envelope for transmission.

The in-store unit such as 20 may perform all of the message buffering and queuing of the devices, the protocol conversion to and from the devices, the error control both with respect to the devices and with respect to the communications link 24, any data or message editing required, the message and character assembly, and the link and message control for routing and information control purposes.

Figure 4:
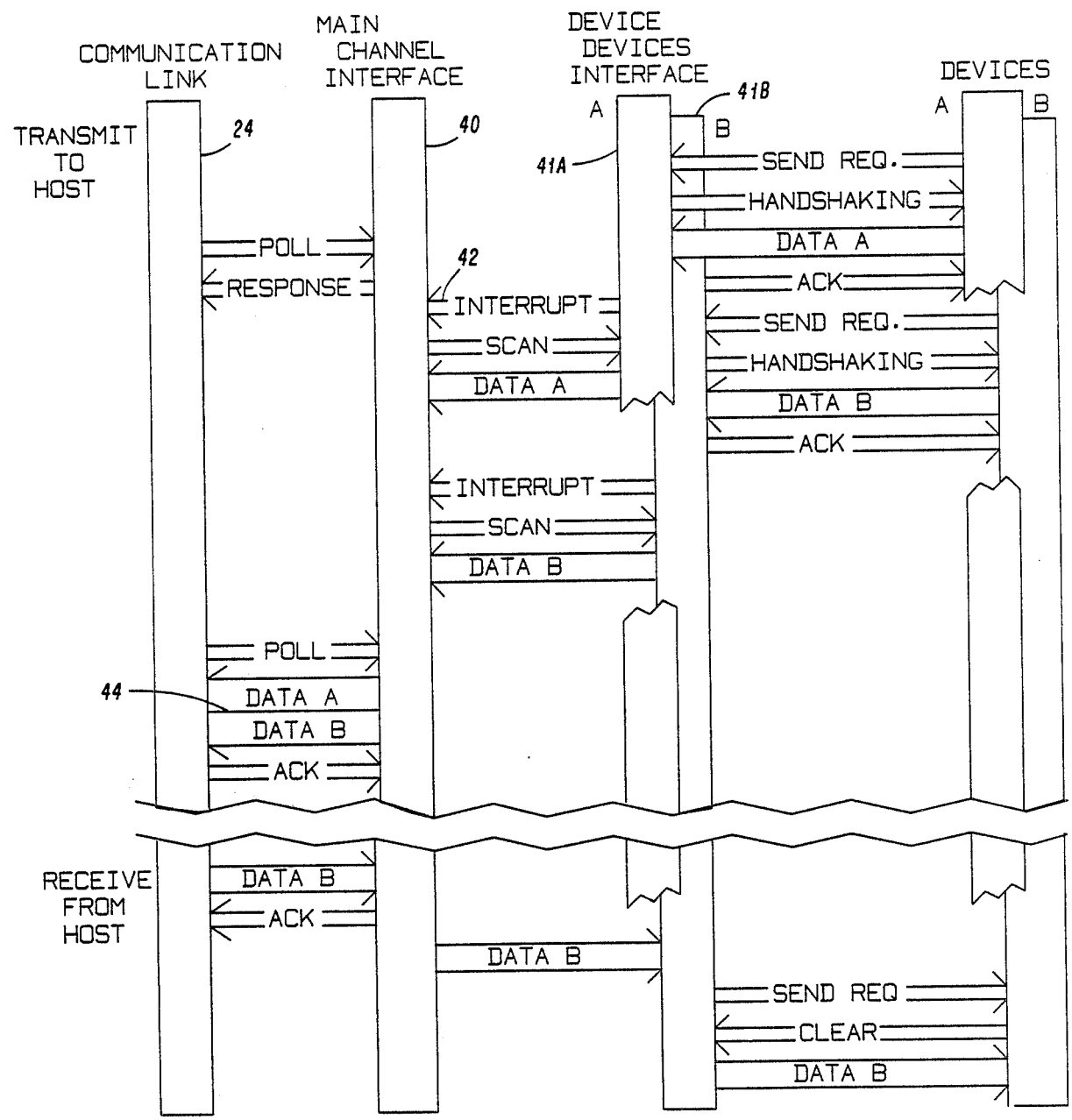
FIG. 4 is a diagrammatic illustration for explaining the operation of an embodiment in accordance with FIGS. 2 and 3.

As represented in FIG. 4, each unit 20 may comprise a main channel interface 40 and respective device interfaces such as 41A and 41B adapted to the respective devices such as 21A and 21B in FIG. 2. Each device interface connects to a respective device of the store location and is primarily responsible for communication to and from the device. All the device interfaces are logically connected to the main channel interface 40 which is the gateway between the devices of a store location and the central site 30. The main channel interface 40 of each unit 20 may operate as a statistical multiplexer to funnel data to or from the in-store devices to the single communications link such as 24, FIG. 2. The main channel interface 40 may also convert the device protocols to a standard high level communications architecture, e.g., SDLC/SNA. The respective device interfaces such as 41A and 41B may be programmable to function as a custom cummunication controller for the respective attached device. Each device interface will communicate with the attached device and buffer the data in a buffer memory. Each device interface may have separate buffers for the receive and the transmit data. Protocol handshaking and error checking with the device is handled at the local level. The message from the device may be stripped of any unneeded control characters at the device interface, and only the information part of the message may be transmitted to the main channel interface 40. Once a block or message containing valid data is loaded into a memory buffer of a device interface, the main channel interface processor will receive an interrupt signal such as indicated at 42 in FIG. 4.

The main channel interface 40 may scan or poll the device interfaces for interrupts. Once an interrupt is detected, the data from the device interface port will be read into the transmit buffer of the main channel interface. The main channel interface may constantly scan the device interfaces, loading information from the devices sequentially into the transmit buffer. At the same time, the main channel interface 40 may be in communication with the central site communication processor via the communications link 24. When the communications controller at the site polls or requests data from the main channel interface 40, the main channel interface may package the information into a variable length SDLC/SNA frame or envelope. Information from more than one device interface can be sent within the same poll although each may be packaged in an individual envelope with the routing and error control information to insure the data reaches its destination properly.

Information from the host system for example for a device such as 21B, FIG. 2, may be transmitted as indicated at 43 in FIG. 4 and will be received by the main channel interface 40 from the communications link 24. The SDLC/SNA frame and control information will be stripped at the main channel interface, and the data will be loaded into the appropriate device interface buffer in this case of buffer interface 41B. Any needed control characters will then be added at the device interface and the information sent to the attached device e.g. device 21B in the proper format.

Multiplexing the data streams from different devices e.g. as indicated at 44 in FIG. 4 maximizes the efficient use of the data in channel 24. The arrangement of FIG. 4 further maximizes the use of the data channel 24 by dynamically allocating communication link throughput to the active devices rather than each device having a specific time slot. This statistical multiplexing of device messages allows for many more devices to be handled than with traditional fixed time slot allocation, time division multiplexing.

The increased efficiency can be achieved because of the fact that the attached devices transmit data intermittently in a burst mode. The device interface and main channel interface have large buffer storage to accommodate temporary peak loading by the individual devices. Priority schemes may be implemented both in the design of the communications units 20 and in the protocol utilized on the communications link 24 to insure that devices with high priority can get their messages through quickly.

Efficiencies better than four to one are achievable with the arrangement of FIG. 4 depending on the type and amount of activity from the devices and the number of store locations on a multi-drop communications line such as indicated at 32, FIG. 3. By way of example, the units 20 may accommodate a maximum aggregate bit rate of 48,000 bits per second with a maximum main channel rate of 9600 bits per second. This means that if the main channel 24 is operated at the maximum speed of 9600 bits per second, the combined speed of the attached devices, if they were to transmit at once, can be no greater than 38,400 bits per second or, for example, sixteen devices at 2400 bits per second this would yield an apparent efficiency of 400 percent.

Obviously, if all devices transmitted at this rate continuously, an overrun could occur when the buffers filled. If a buffer overflow was to occur because of excessive retransmission or some other problem, such that the data could not be transmitted out of the main channel interface 40, the device interfaces may terminate the flow of data from the devices. Because the interfaces are programmable, an orderly shutdown can occur without loss of data. Communication may then begin normally where it left off once the channel is clear.

The communications network arrangement illustrated in FIG. 4, as previously mentioned, may utilize the communication network management defined by System Network Architecture (SNA). SNA defines the total spectrum of networking communications in the logical structure, the formats, the protocols, operational sequences, management functions, routing, problem determination, etc. The most significant feature of SNA is the transparency with which communication tasks can be performed.

Synchronous Data Link Control (SDLC) is the protocol that is defined in the SNA architecture. SDLC has substantial advantages over protocols such as Bisync or Async. Some of these advantages are in error correction and message validation, code independence, control information, and channel efficiency.

The arrangement of FIG. 4 may utilize a standard defined communication structure supporting sixteen logical units (LU's). One of the logical units is reserved for downloading parameters and object code programs for the main channel 40 and the device interfaces via communications link 24, and for diagnostic functions. This leaves a possible fifteen logical units available for the attached devices of a given store location.

Figure 5:
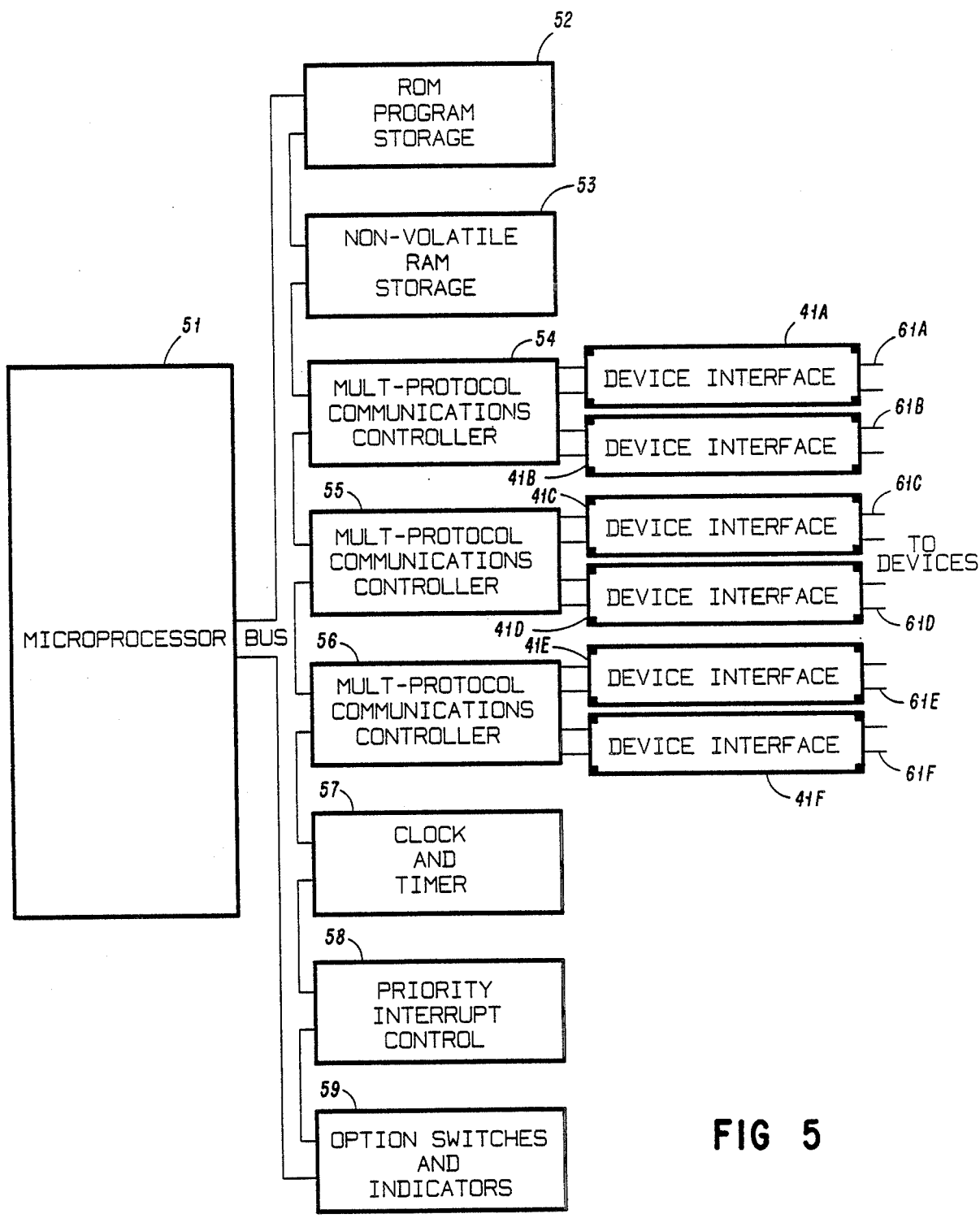
FIG. 5 is a block diagram for illustrating a preferred implementation of the embodiment of FIGS. 2-4.

Besides the technical reasons, the implementation of SDLC/SNA high level protocol and network architecture in the emulation of the standard has several advantages for a group of stores such as represented in a network in FIG. 3. Some of the advantages are:

State of the art networking architecture (defacto standard)
Consistent with long term network evolution
Communicates with standard hardware
Multi-drop dedicated or switched line network supported
Features such as automatic data routing and priority schemes implemented with minimal application program support
Tested and proven
Supports up to fifteen devices per location FIG. 5 illustrates a preferred implementation for each of the communications units wherein the device interfaces for a given store location are indicated at 41A–41F, and wherein the main channel interface 40 may be implemented as represented by components 51–59. Component 51 may be a microprocessor having ROM program storage 52 and non-volatile RAM storage 53 for the storage of executable program code. Through the implementation of a multitasking real-time operating system, the channels such as indicated at 61A–61F may be logically represented as independent processes.

The main channel interface has loaded in ROM component 52 the standard system routines and the bootload program. Custom object code can be downloaded via the communications channel 24 (which may be coupled via channel 61A, for example). Such custom object code can be loaded in the non-volatile RAM storage component 53. Some of the functions of the downloaded programs could be:

Special parameters
Network or system specific
  security (password)
  auto log-on
  XID
  etc.
data compression
data encryption The device interfaces 41A–41F may be standardized hardware components that can be programmed to operate in respective individual modes adapted to the respective devices such as indicated at 21A–21N, FIG. 2. Program object code for these device interfaces 41A–41F can be downloaded from the central location 30 at any time. The code can be stored in and executed from the non-voltatile storage 53 so that it will not need to be reloaded in case of a power failure. If a custom program is not loaded, the device interface will default to a standard Async interface program causing the interface to operate in a pass-through data mode.

The ability to download custom programs for each of the respective device interfaces 41A–41F allows an unlimited amount of power and flexibility in the system. As new devices with new features or functions are added, the communications unit of FIG. 5 can also easily be upgraded by simply downloading a new program to handle the change. Configuring and installing a store location is also simplified because it is controlled from the central site 30 by installing standard hardware and then downloading programs for the respective devices in the store.

Some of the functions that can be programmed are not only in the area of parameters such as bit rate, sync or async data, DTE or DCE interface, etc. but also to operate as a custom communications controller for the attached device. Programmability of the device interfaces 41A–41F to this level allows a multitude of possibilities including the capability to off-load some of the tasks that would normally be performed by the central system and the network. An example of this would be in the attachment of a device that used polled communications (like the IBM 2260 protocol). The device interface attached to such a device could be programmed to poll the device locally, emulating a host-polling sequence. Data would then only traverse the network when real information was being sent, optimizing the network data traffic. Normally the data from the device would simply be protocol converted in a component such as 54–56, FIG. 5, by having an SDLC/SNA wrapper put on it and not changing the content of the data, although code conversion or data stream conversion could also be programmed selectively on the device ports.

The programmability and the intelligence provided by the unit of FIG. 5 enables efficient operation of a diverse network such as indicated in FIG. 3. Without programmability and the ability to optimize the network data traffic, the communications system such as shown in FIG. 3, could be clogged with overhead data, increasing the response time to an unacceptable level. The result might be a requirement for higher speed modems, point to point instead of multi-point communications links, added communications controllers, etc., or a combination of these, all costing more to accomplish the same goal.

According to FIG. 5, the power and intelligence of the network of FIG. 3 is distributed to the local stores and to the device interfaces where it can be most efficiently and effectively used.

By way of presently preferred exmple, the unit of FIG. 5 may be implemented as shown in detail in FIGS. 6A through 6J. Parameters for the detailed circuit of FIGS. 6A through 6J are given on the following pages:

Exemplary Type Designations for Major Components in FIGS. 6A–6J

| Ref. No. | Component Description | Type No. |
|---|---|---|
| FIG. 6A | | |
| U3 | Microprocessor (68 Pins) | 80188 |
| U38 | | |
| U2 | D-Type Positive Edge-Triggered Flip-Flop | 74 LS74 |
| U5 | Octal Transparent, D-Type, Three State Latch | 74HC573 |
| U8 | | |
| U11 | | |
| FIG. 6B | | |
| U15 | Real time Clock | 146818 |
| U16 | Erasable PROM (e.g. 32K) | 2764 |
| U39 | Octal Bus Transceiver, 3-State | 74HC245 |
| U36 | D-Type Positive Edge-Triggered Flip-Flop | 74LS74 |
| U2 | | |
| U37 | 20 Input, 10 Output Programmable Logic | PAL20L10 |
| REG1 | Adjustable Positive Output Voltage Regulator | LM317T |
| FIGS. 6C, 6D | | |
| U12 | Multi-Protocol Serial Controller | 8530 |
| U13 | | |
| U14 | | |
| U35 | Two-to-One Multiplexer | 74LS157 |
| U34 | Non-Volatile Controller/Decoder | DS1212 |
| FIGS. 6E AND 6F | | |
| U6 | Hex Inverter Schmitt Trigger | 74HC14 |
| U7 | | |
| U1 | Bidirectional Bus Transreceiver, Three State | 75176 |
| U4 | | |
| U41 | EIA RS232C Line Driver | MC1488 |
| U43 | | |
| U42 | Octal Buffer, Three State | 74HC240 |
| U45 | | |
| U9 | Hex Inverter Schmitt Trigger | 74HC14 |
| U10 | | |
| U44 | EIA RS232C Line Driver | MC1488 |
| U46 | | |
| FIG. 6G | | |
| U18– | Non-Volatile RAM (e.g. 128k expandable to 512k) | 64256 |
| U33 | | |
| FIG. 6J | | |
| U50 | Hex Inverter Schmitt Trigger | 74HC14 |
| U51 | | |
| U47 | EIA RS232C Line Driver | MC1488 |
| U49 | | |
| U48 | Octal Buffer, Three State | 74HC240 |

Exemplary Parameters for Minor Circuit Elements in FIGS. 6A–6J

FIGS. 6A, 6B

Y1, 16,000 megahertz; Y2, 32.768 kilohertz

Resistors (K stands for kilohms; M stands for megohms)

RP1, RP2, RP3, 10 K each; RP16, 10 K each; R2, 22M; R4, R5, 100 K; R6, 10 K; R7, 47 K; R8, 68 ohms (Use, e.g., ⅛ watt resistors)

Capacitors (PF means picofarads; UF means microfarads)

C52, C53, 22PF; C54, 10PF; C55, 22PF; C56, 47PF; C59, C60, 1.0UF; C61, 1.0UF; C62 10UF (16 volts)

Diodes

CR5, IN4005 CR4, IN 5919 (5.8 volts, 1.5 watts)

FIG. 6D

Capacitors (UF means microfarads)

C57, 0.1 UF, C58, 220 UF (6.3 volts)

FIGS. 6E, 6F

CRS1, CRS2, CRS3, CRS4, DCLAMP.

Resistors (K stands for kilohms) R1, 10 K; R9, R10, 4.7 K, RP4–RP11, 27 K each; R11–R33, 20 K each; R20, R23, 4.7 K; R17, 10 K (Use, e.g., ⅛ watt resistors)

FIG. 6H

Capacitors (UF means microfarads)

Figure 6A:
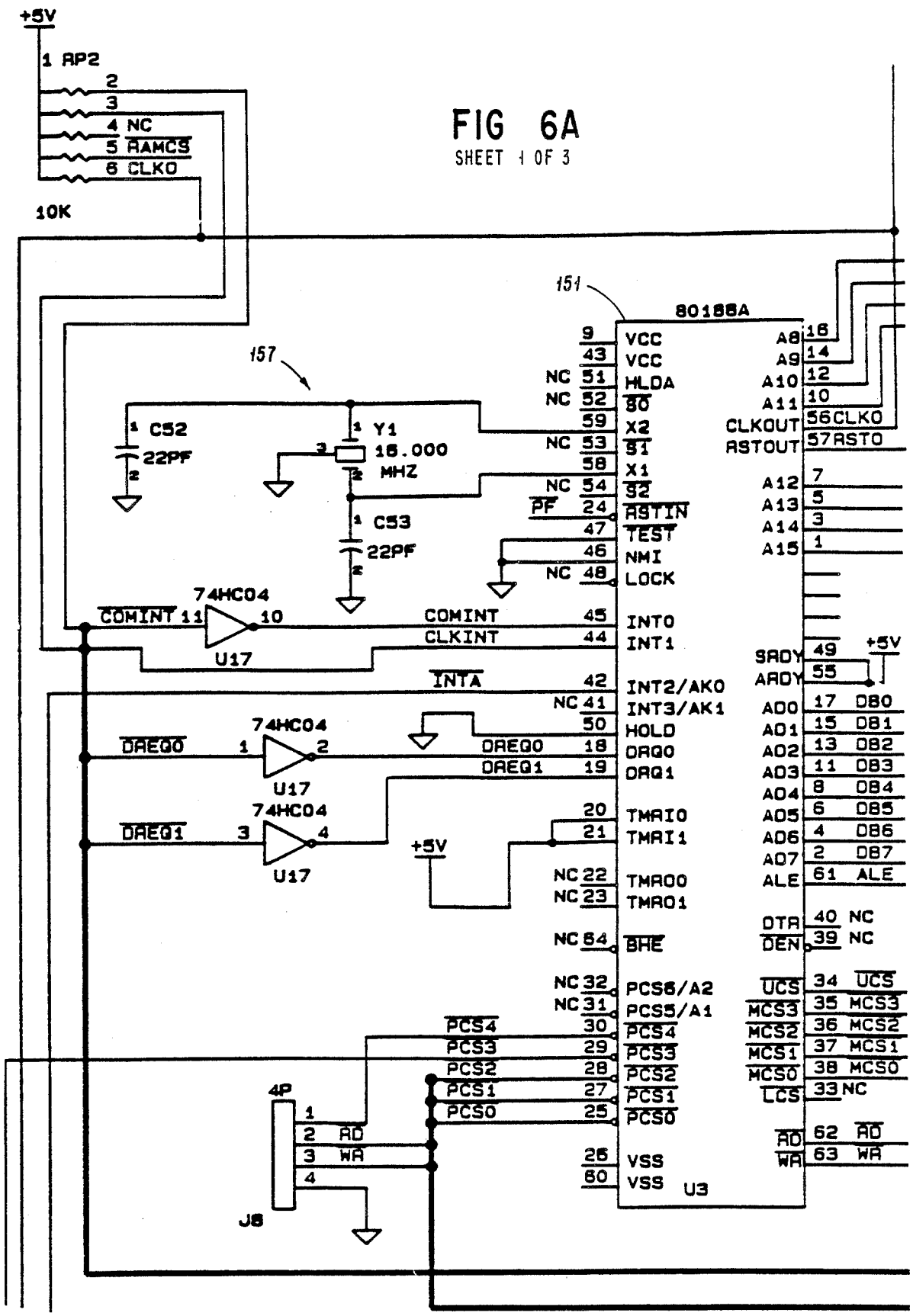
FIGS. 6A (3 sheets) through 6J taken together constitute an electric circuit diagram for showing a preferred implementation of the embodiment of FIGS. 2-5.
Figure 6A:
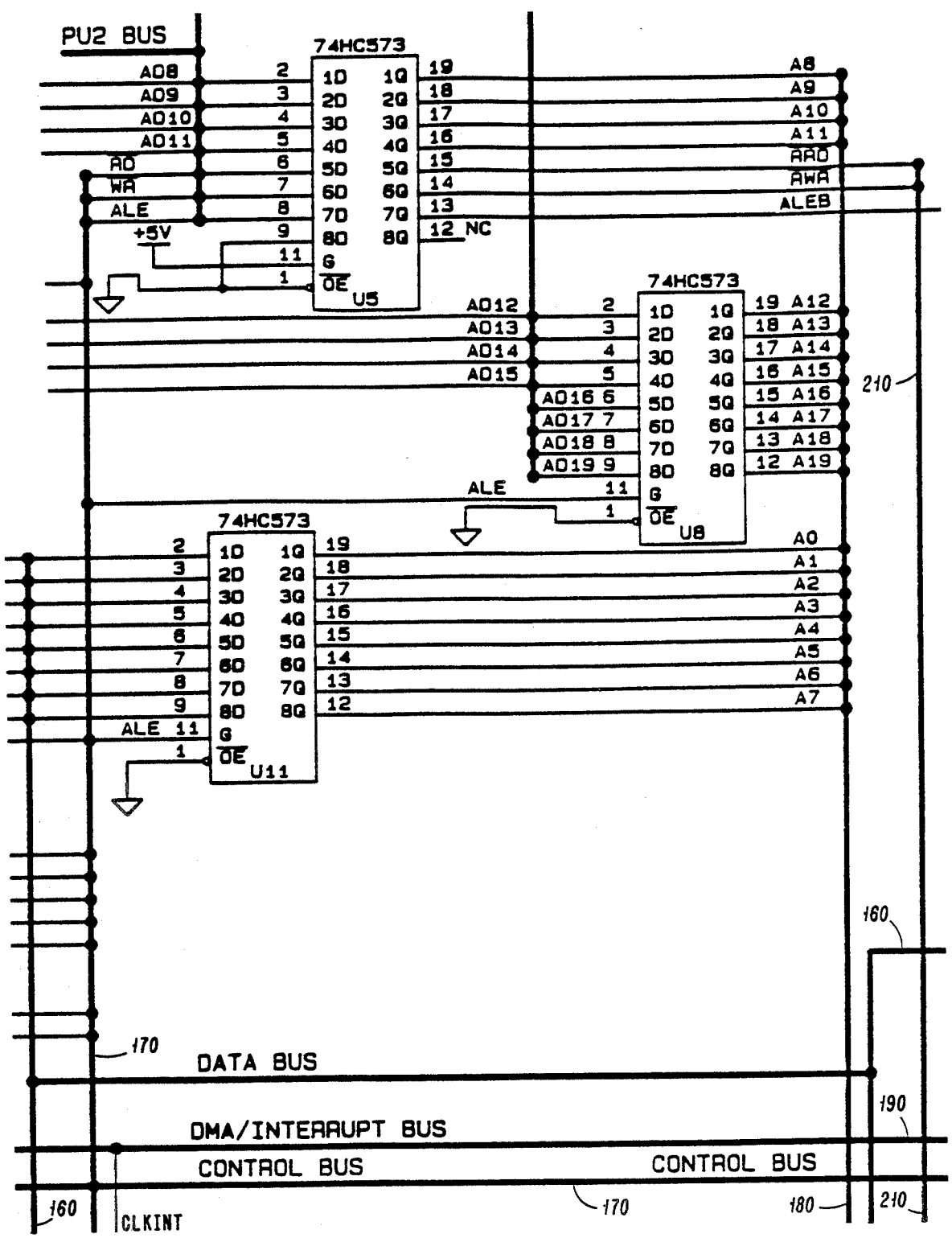
Figure 6B:
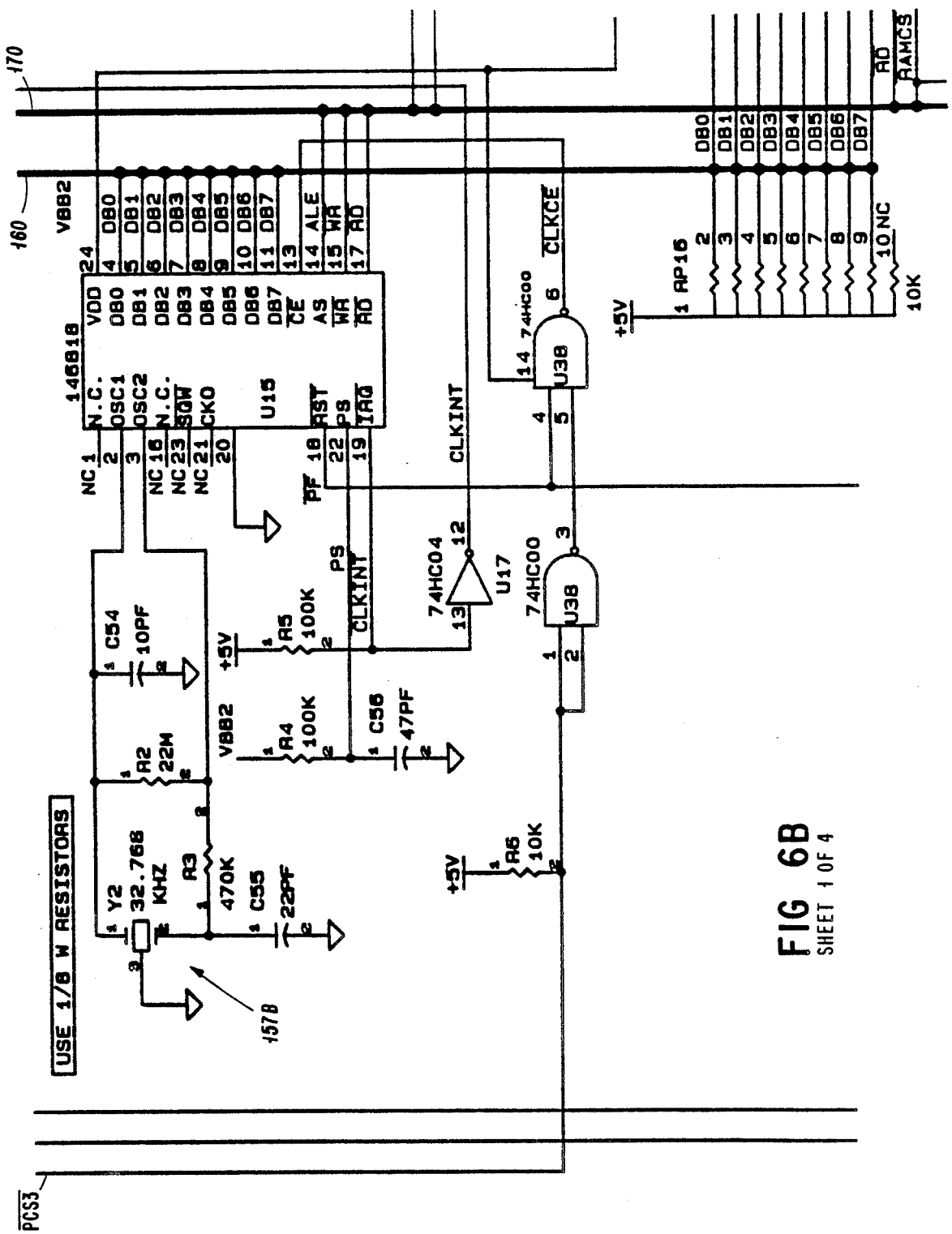
FIG. 6B (4 sheets) being a continuation of FIG. 6A in a downward direction.
Figure 6B:
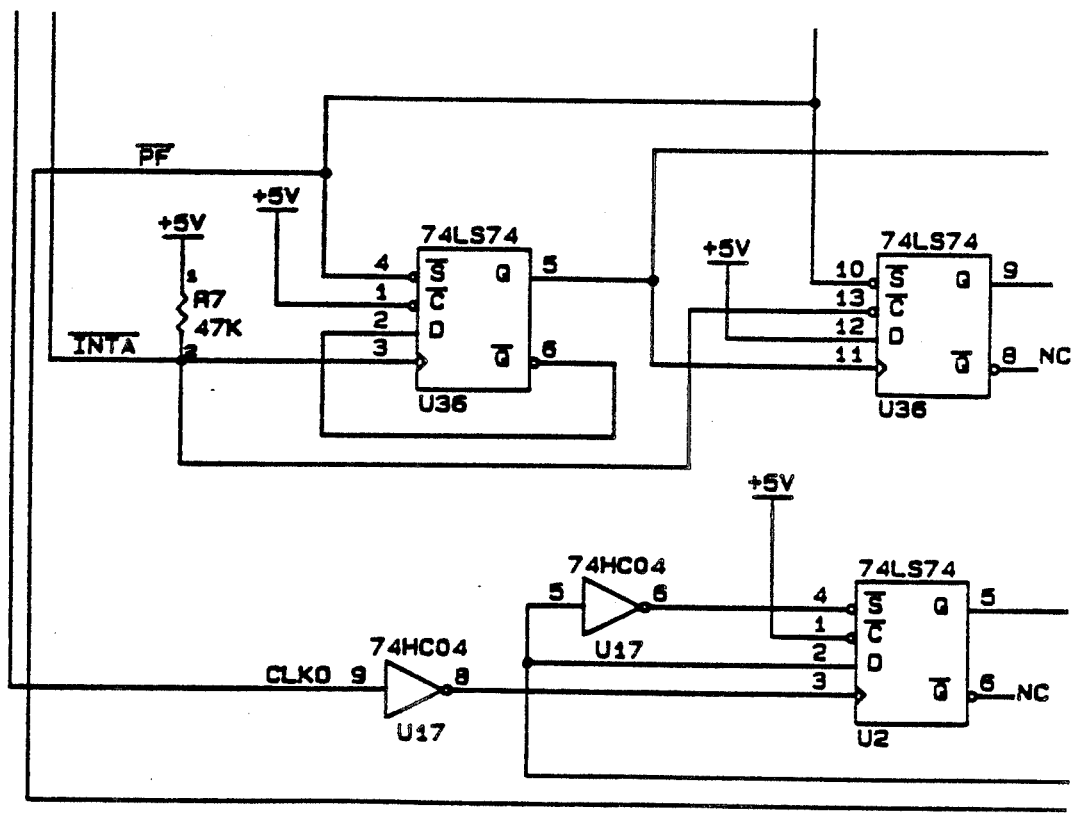
Figure 6B:
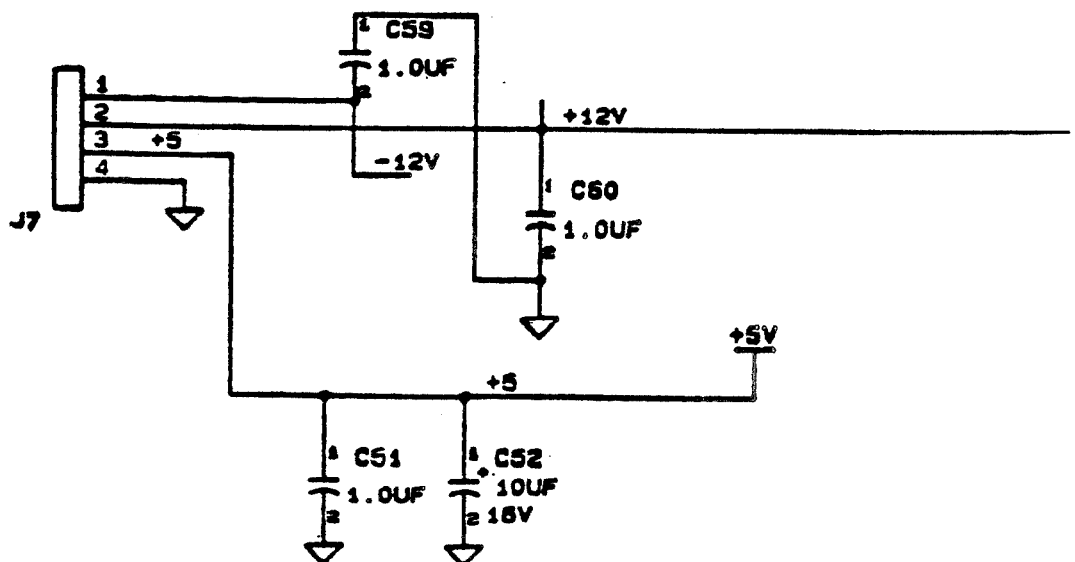
Figure 6B:
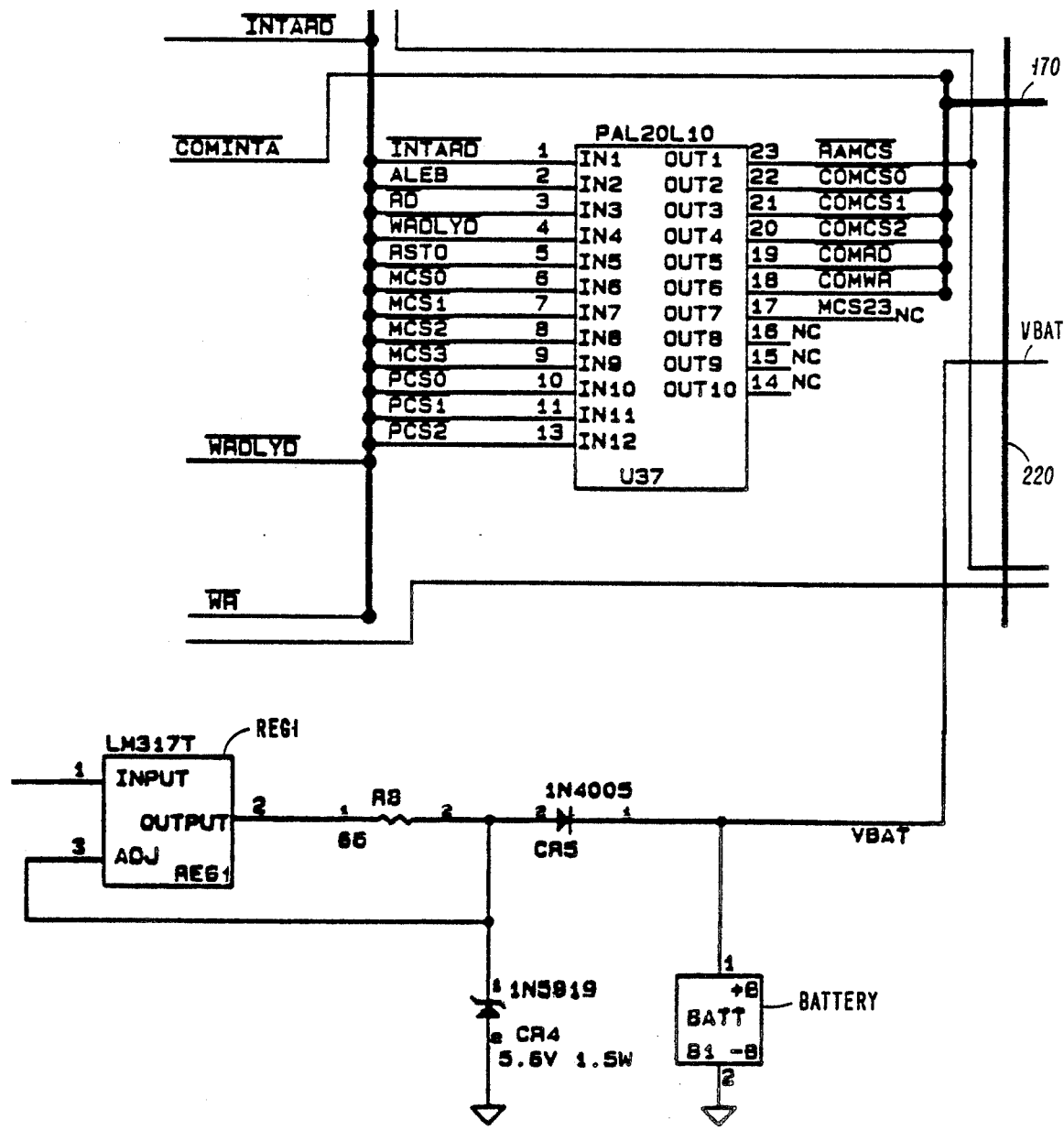
Figure 6C:
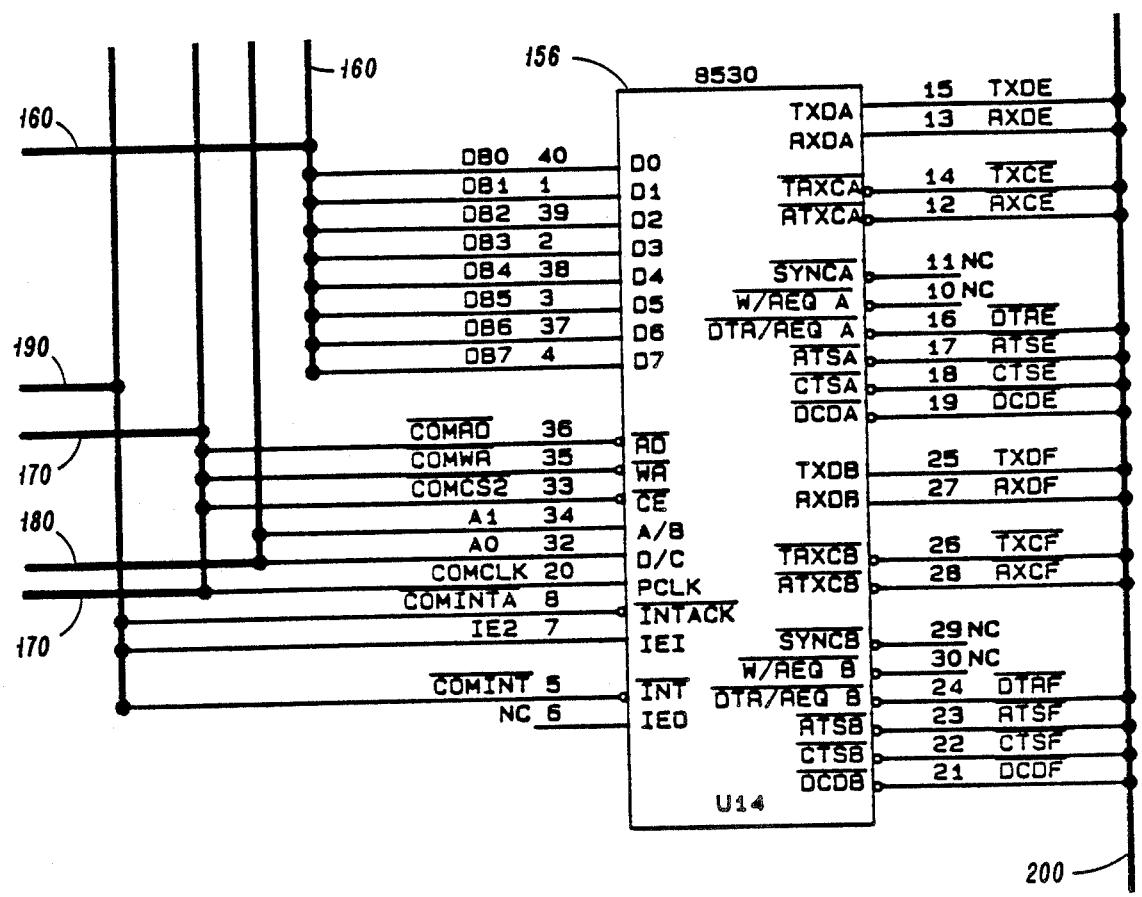
FIG. 6C (2 sheets) being a continuation of FIG. 6A to the right.
Figure 6D:
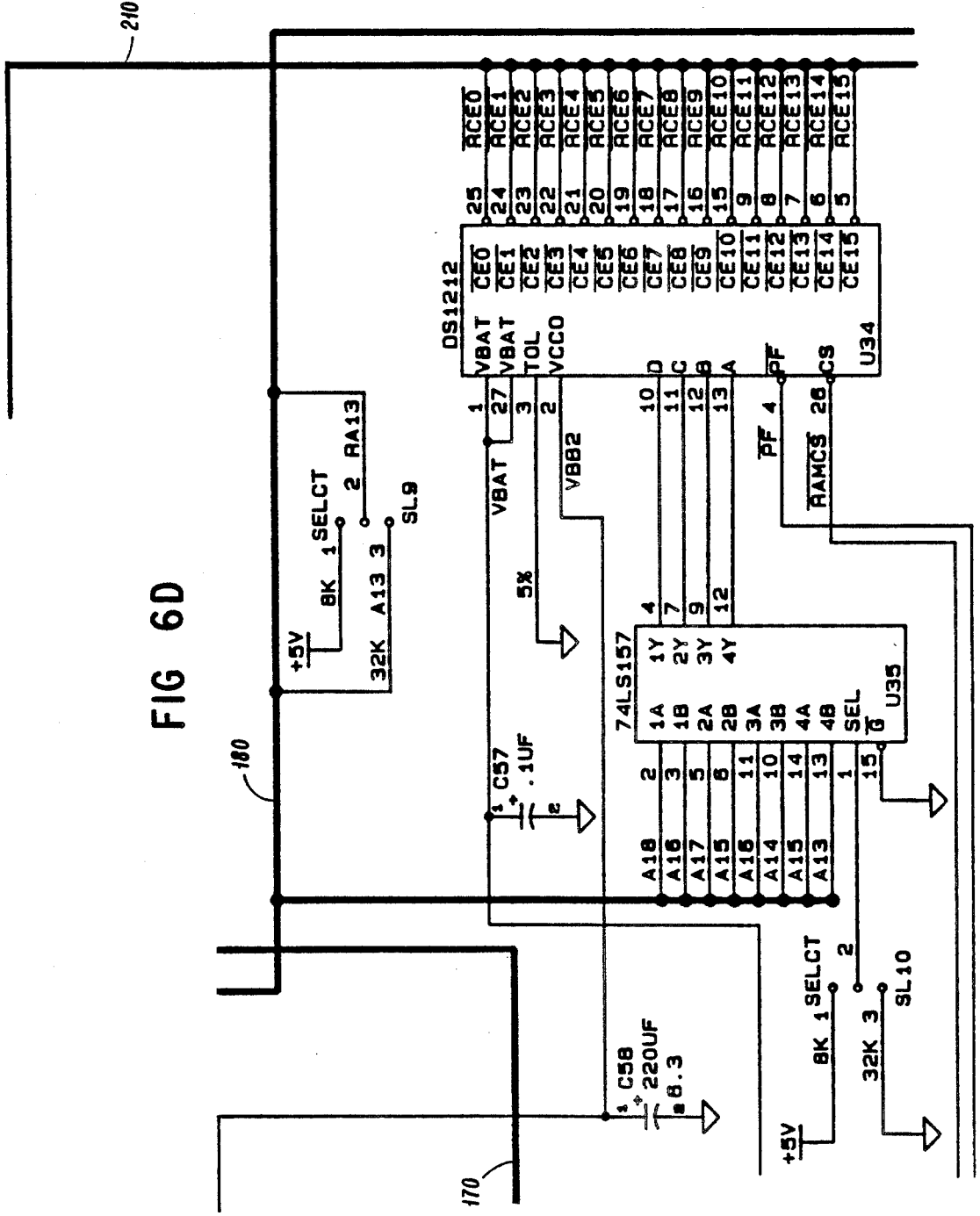
FIG. 6D being a continuation of FIG. 6B to the right and a continuation of FIG. 6C in the downward direction.
Figure 6E:
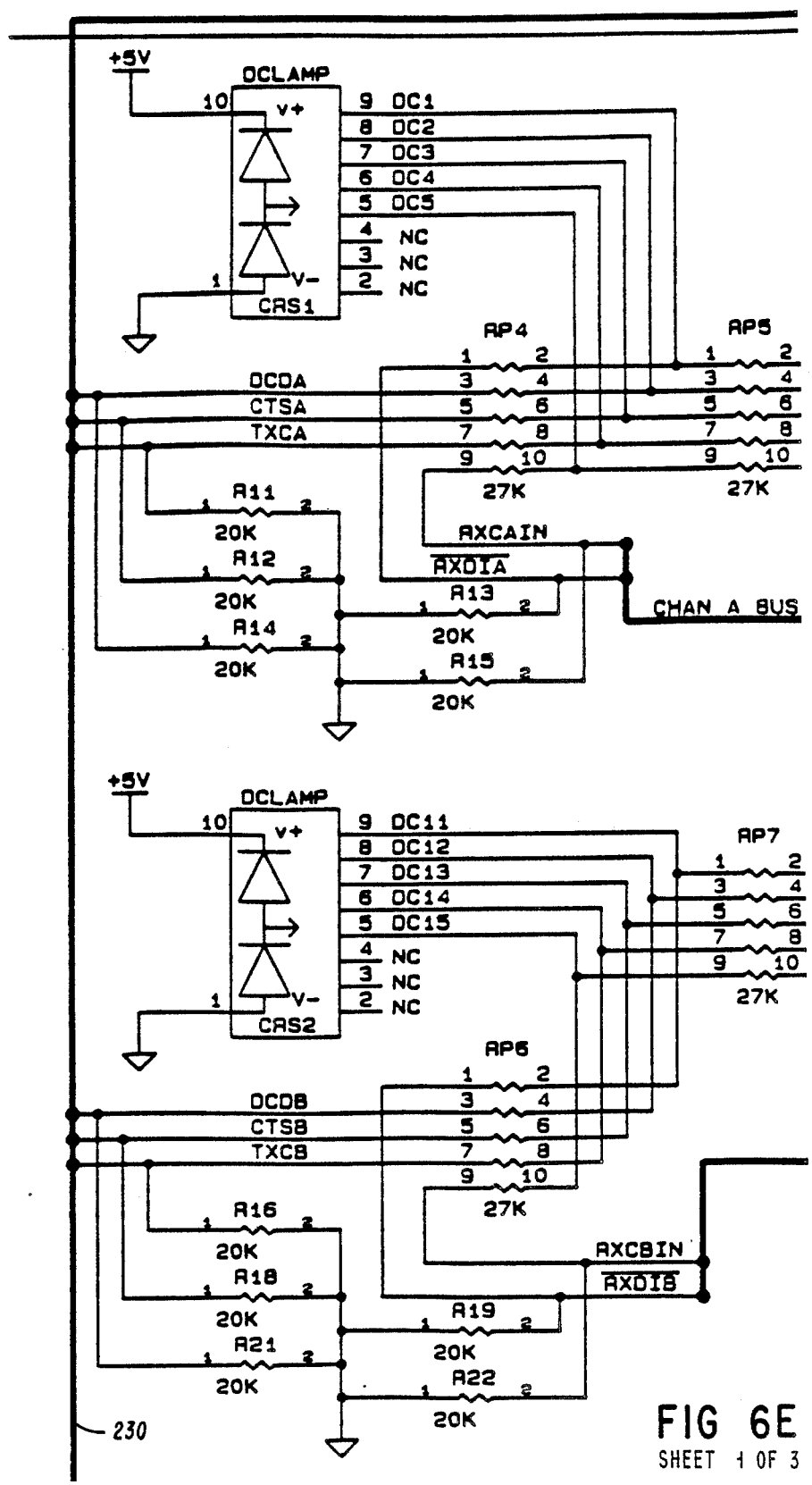
FIG. 6E (3 sheets) being a continuation of FIG. 6C to the right.
Figure 6E:
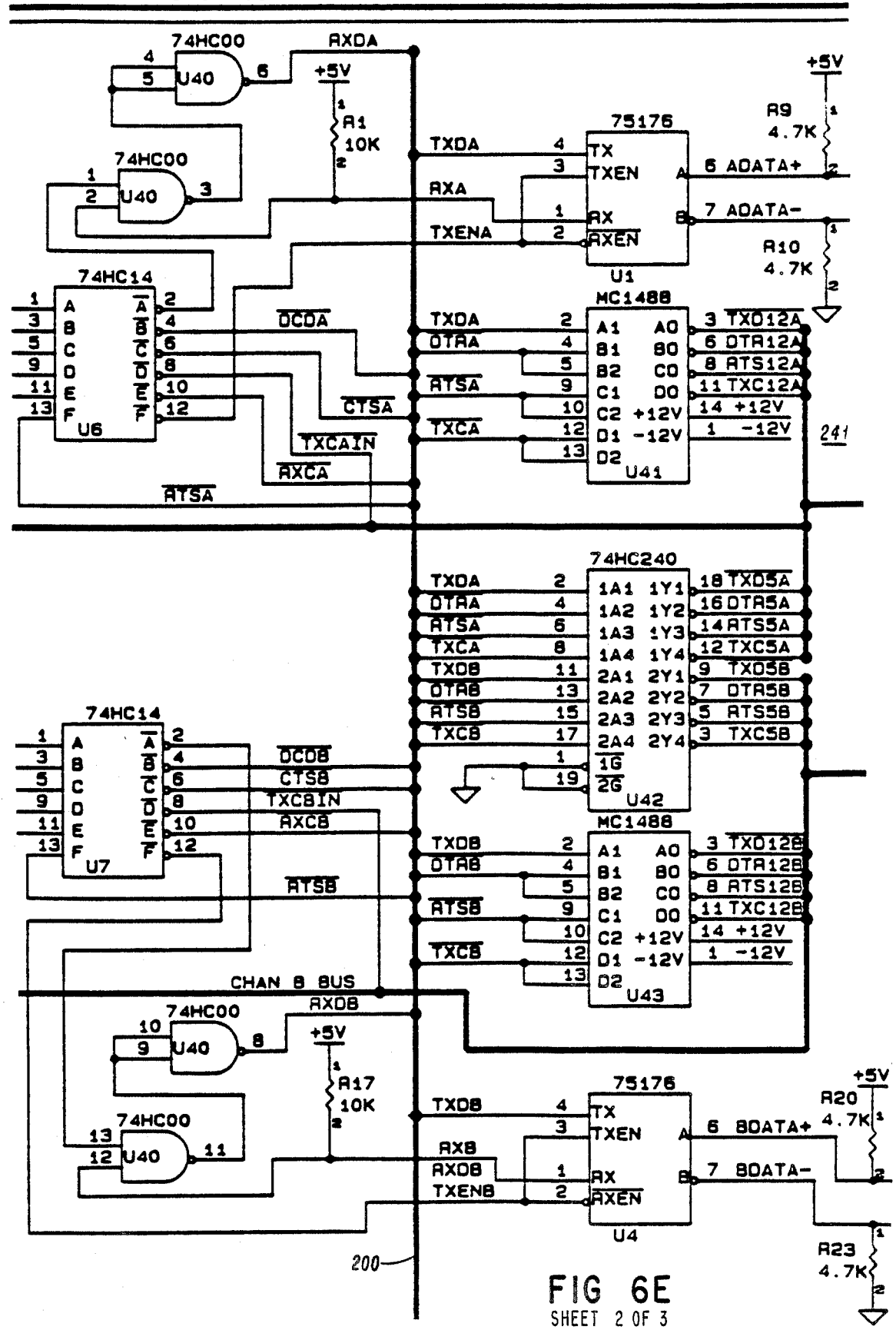
Figure 6E:
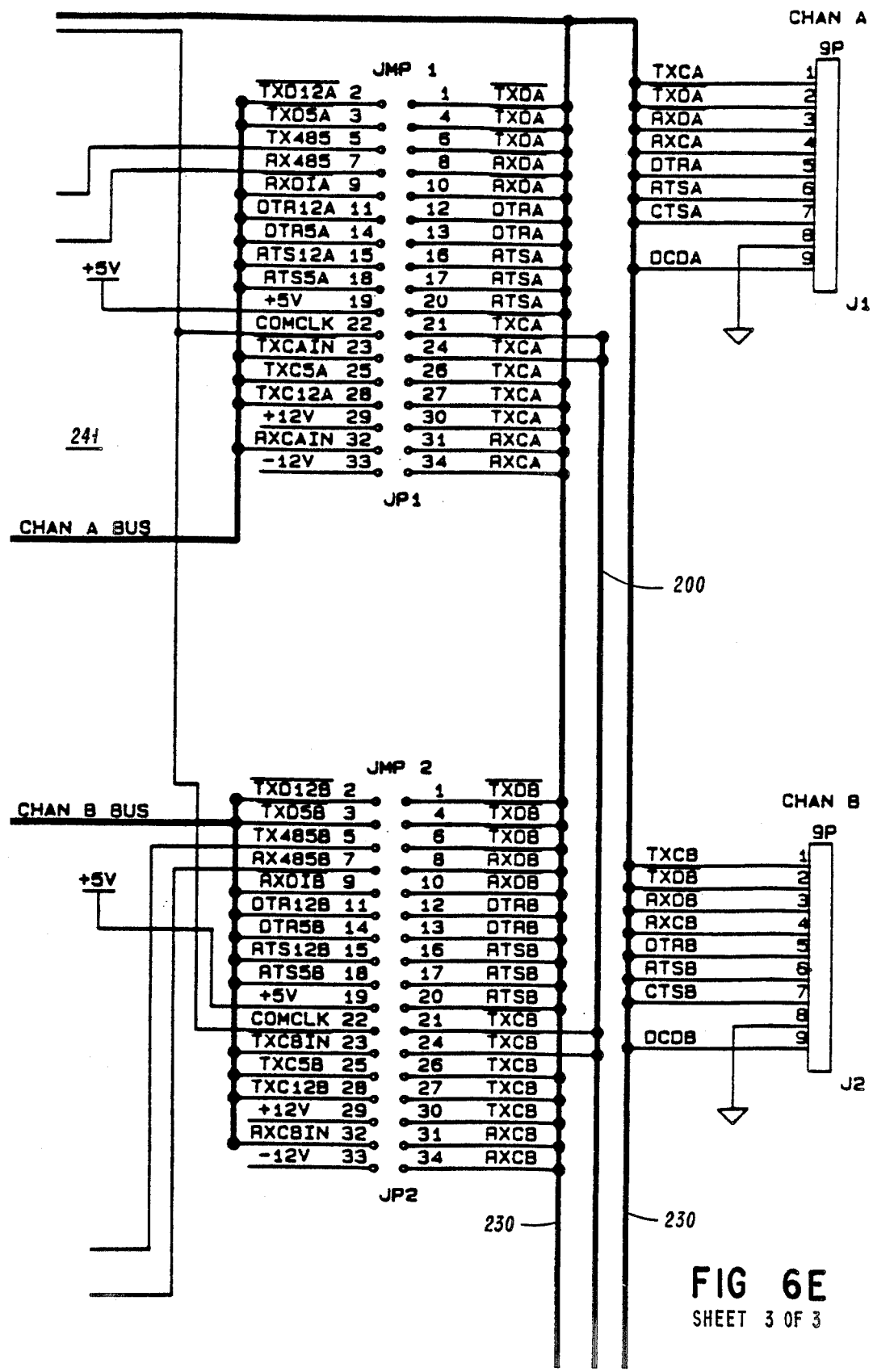
Figure 6F:
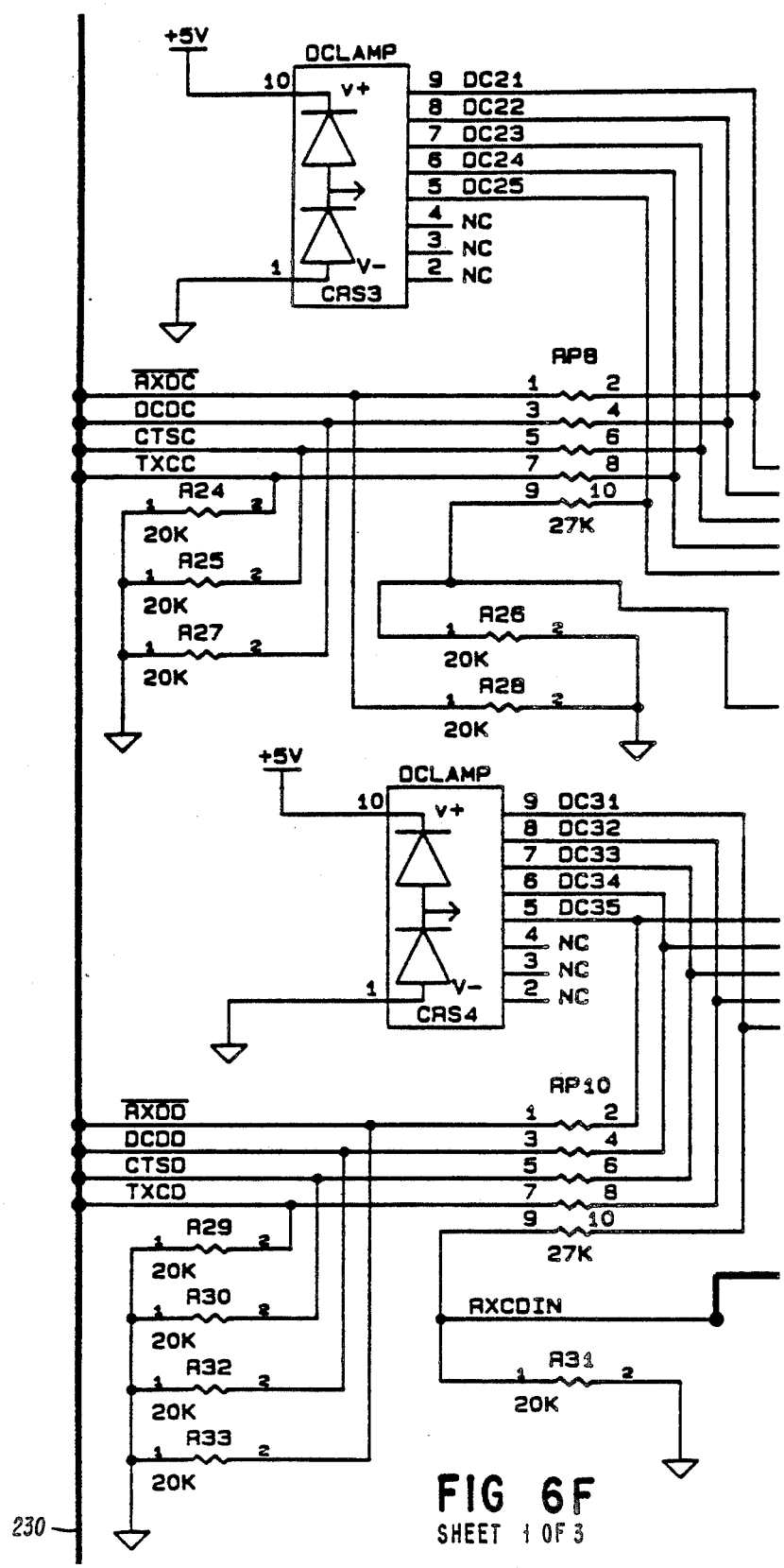
FIG. 6F (3 sheets) being a continuation of FIG. 6E in the downward direction.
Figure 6F:
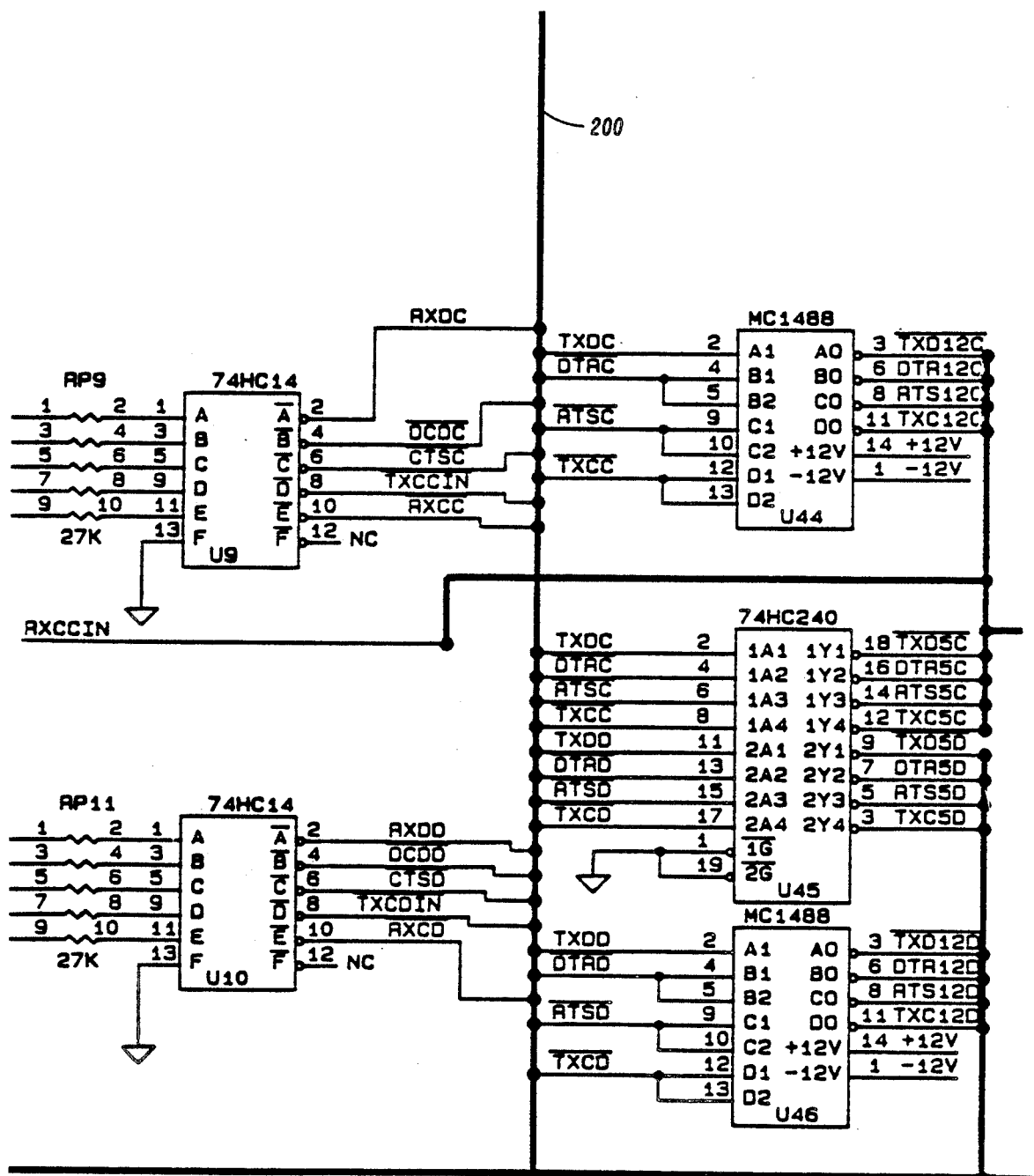
Figure 6F:
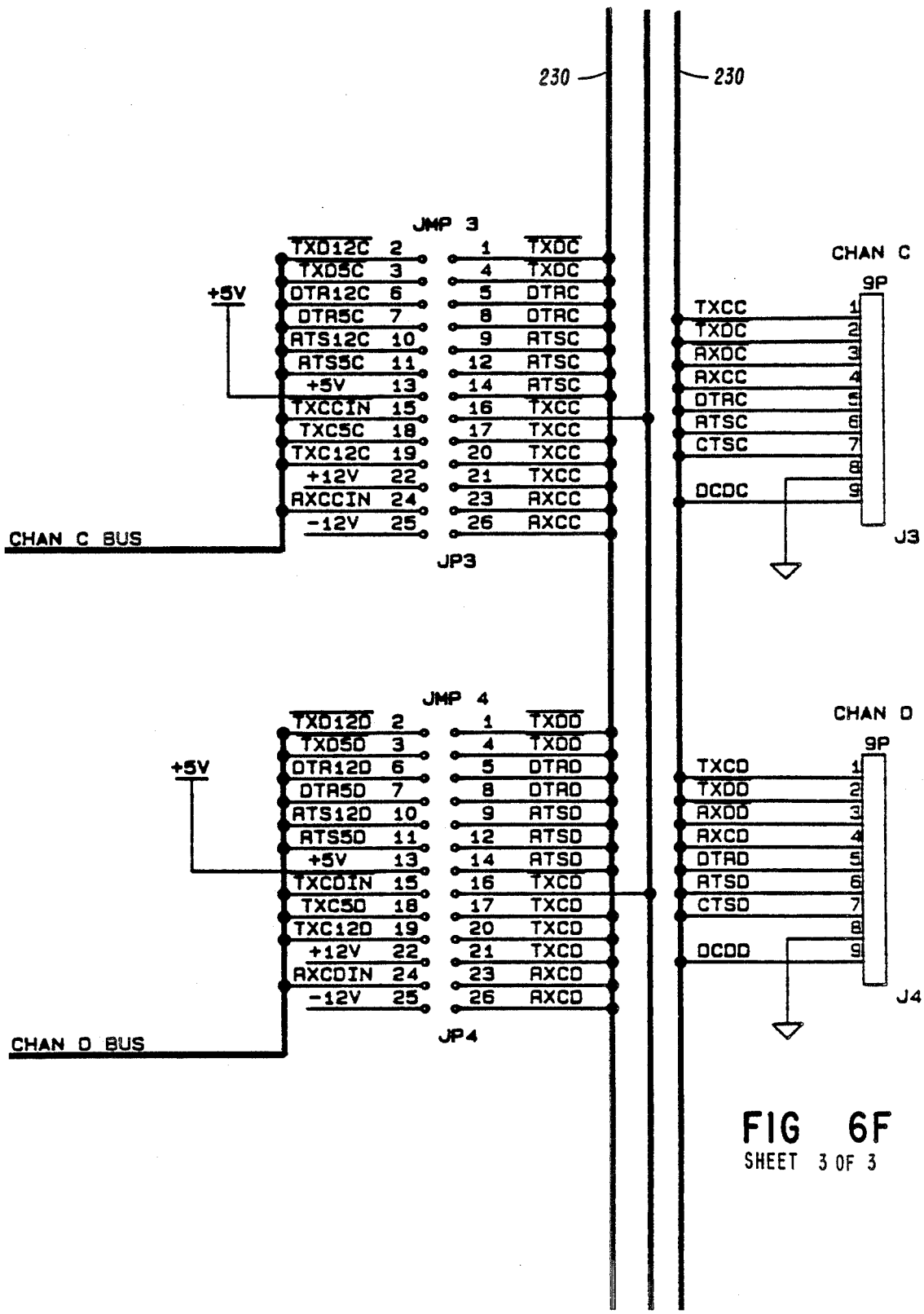
Figure 6G:
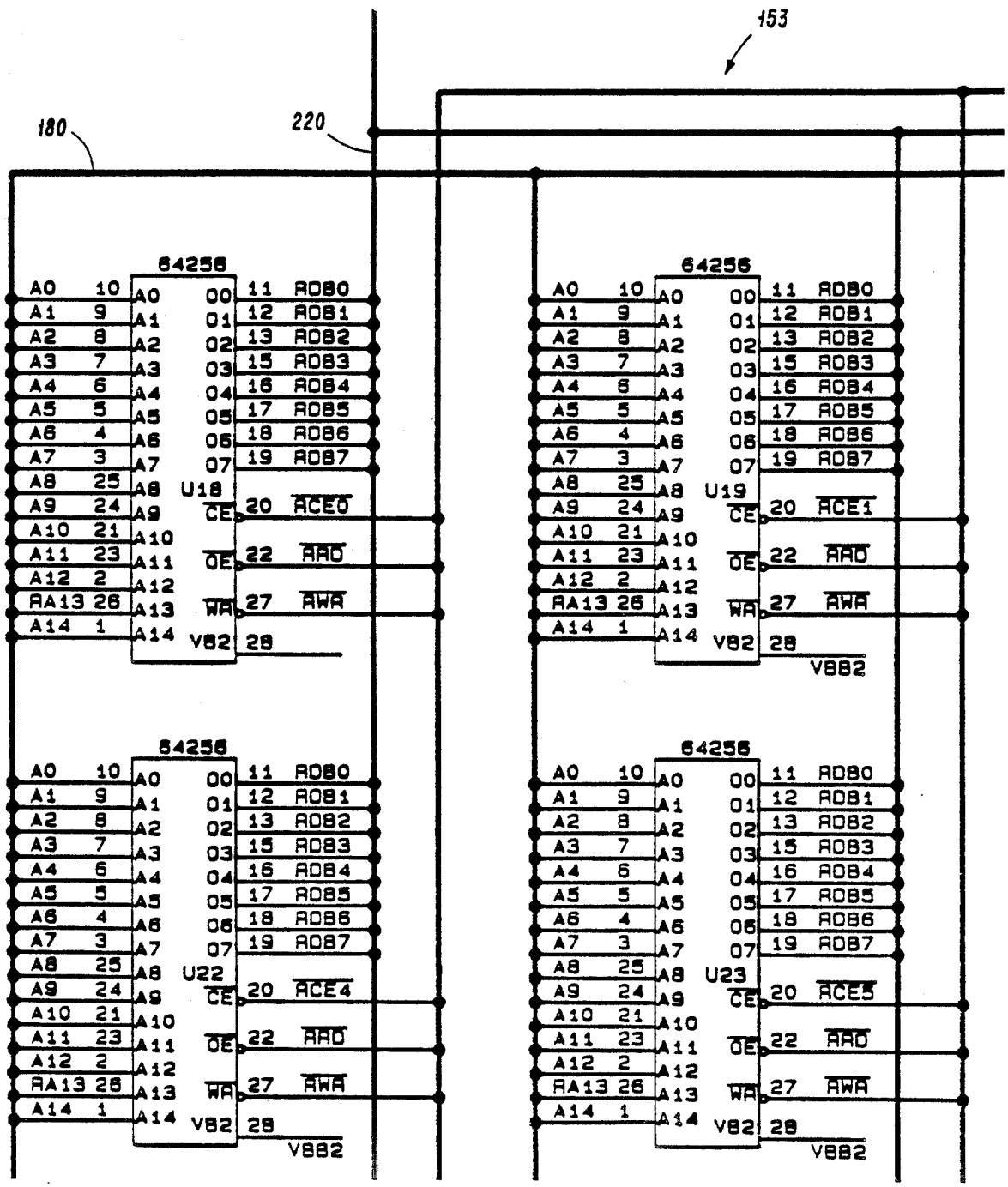
FIG. 6G (4 sheets) being a continuation of FIGS. 6B and 6D in the downward direction.
Figure 6J:
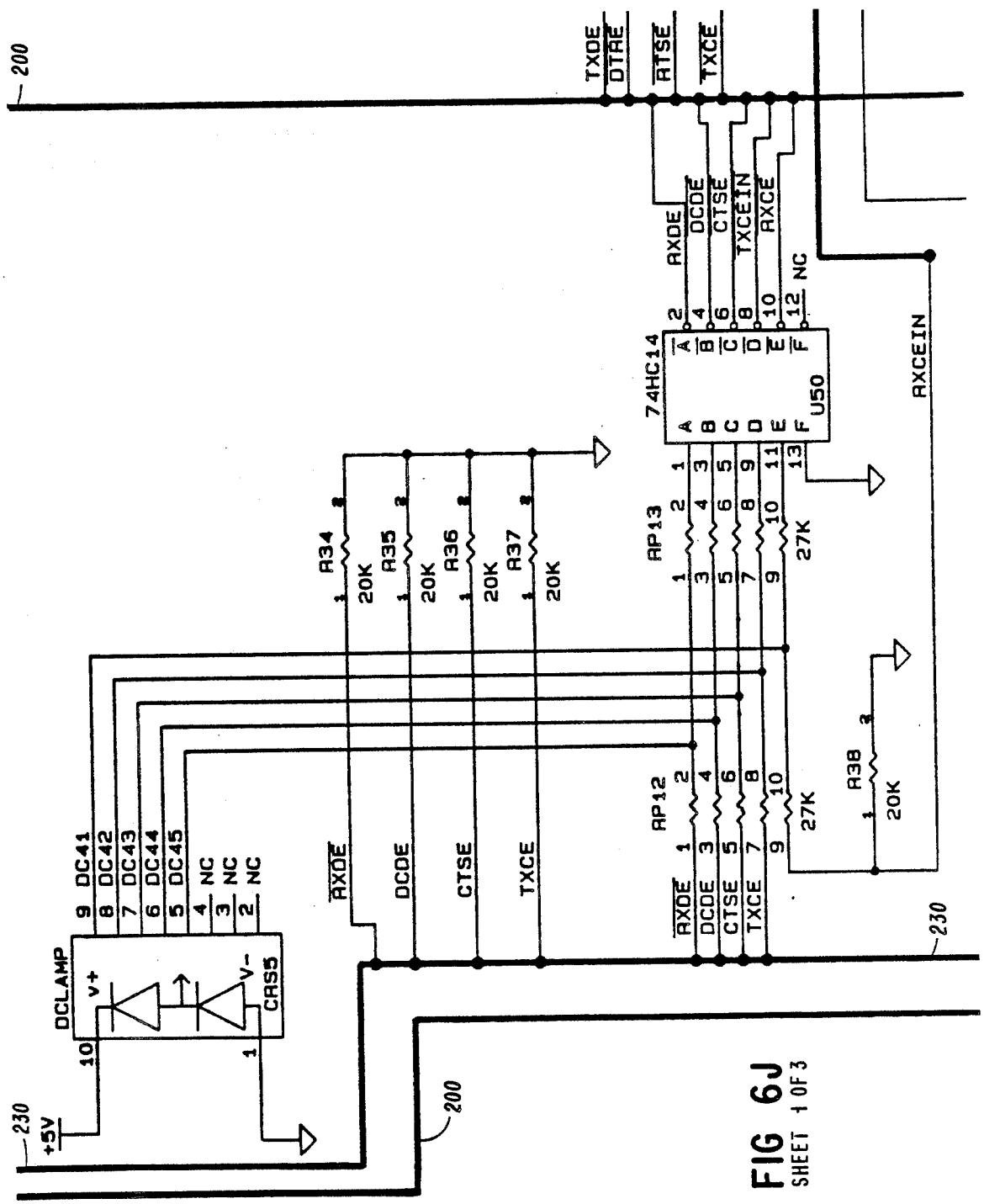
FIG. 6J (3 sheets) being a continuation of FIGS. 6D and 6F in the downward direction.
Figure 6J:
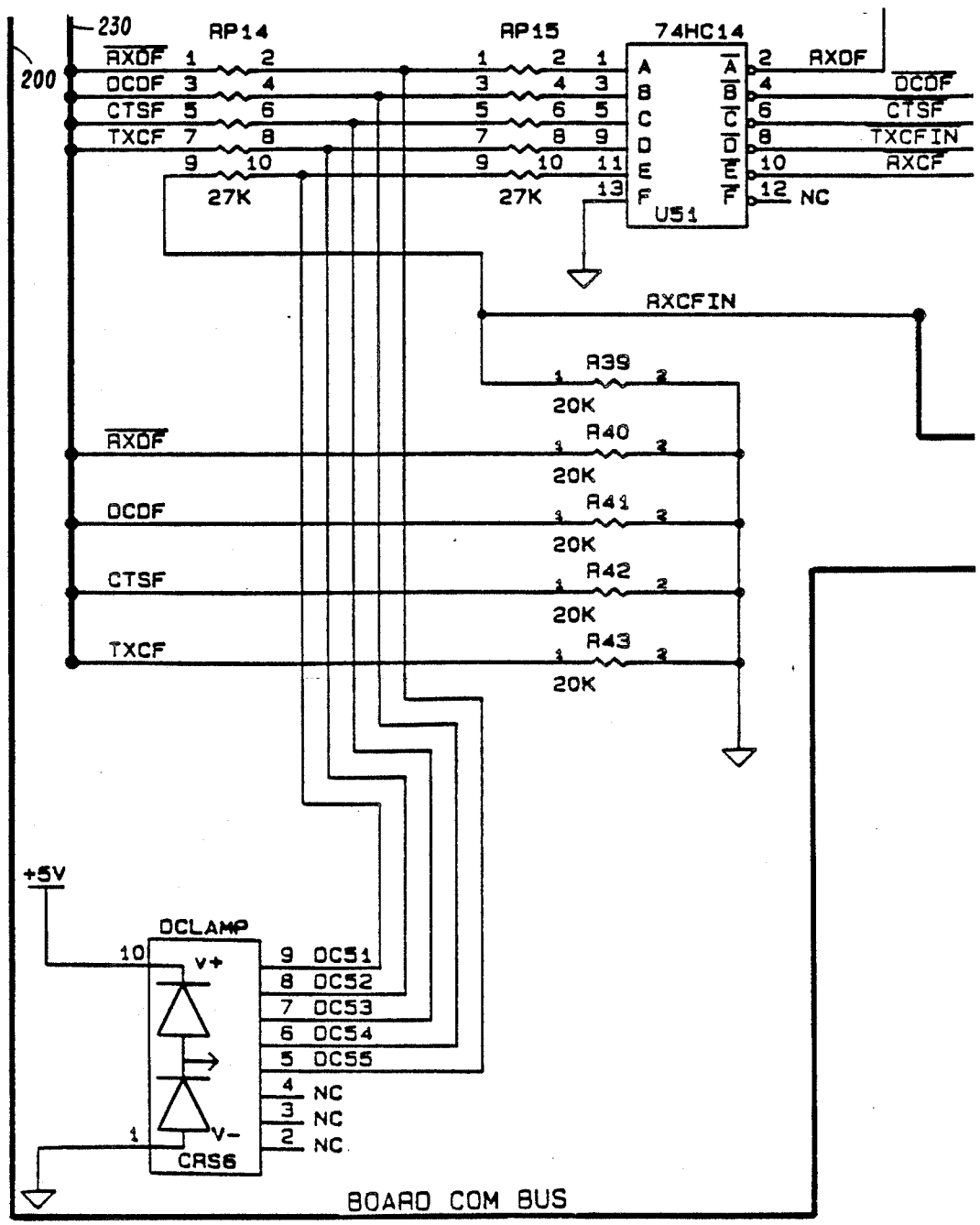
Figure 6J:
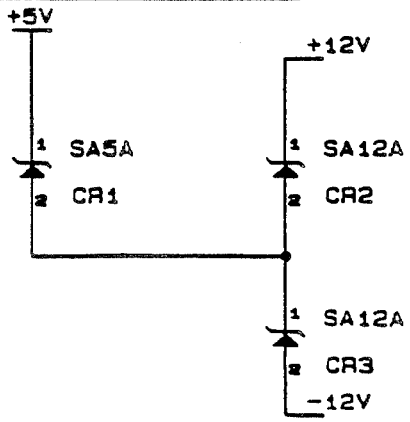

C18–C38, 0.1 UF (all capacitors connected between VBB2, pin 28 of U22–U33, FIG. 6G, and ground)

FIG. 6I

Capacitors (UF means microfarads) C1–C51, 0.1 UF (all capacitors connected between +5 V, plus five volts, and ground.

FIG. 6J

CRS5, CRS6, DCLAMP

Resistors (K means kilohms)

R34–R37, 20 K; R39–R43, 20 K each (Use, e.g., ⅛ watt resistors)

Diodes

CR1, SA5A; CR2, CR3, SA12A

To assist in correlating FIGS. 6A–6J with FIG. 5, the following comparison is presented:

Comparison of FIGS. 6A–6J with FIG. 5

| Component | General Ref. No. and FIG. | component Ref. Nos. and FIG. |
|---|---|---|
| Microprocessor | 51, FIG. 5; 151, FIG. 6A | U3, U36, FIG. 6A |
| ROM Program Storage | 52, FIG. 5 152, FIG. 6B | U16, FIG. 6B |
| Non-Volatile RAM Storage | 53, FIG. 5 153, FIG. 6G | U18–U33, FIG. 6G |
| Multi-Protocol Communications Controller | 54–56, FIG. 5 154–156, FIG. 6C | U12, U14, FIG. 6C |
| Clock and Timer | 57, FIG. 5 157A, FIG. 6A 157B, FIG. 6B | Y1, FIG. 6A Y2, FIG. 6B |

THE TEXT THAT IS BEING OMITTED HERE IS IN A SAVE AREA NAMED "put back".

Certain conductors associated with selected components of FIGS. 6A–6J are listed as follows:

Multi-Protocol Communications Controller, 154–156, FIG. 6C

Input Line Designations

DB0–DB7 (Data Bus 160)

$\overline{\text{COMRD}}$ (Control Bus 170)

$\overline{\text{COMWR}}$ $\overline{\text{COMCS0}}$, $\overline{\text{COMCS1}}$, $\overline{\text{COMS2}}$, COMCLK A1, A0 (Address Bus 180)

$\overline{\text{COMINTA}}$ (DMA/Interrupt Bus 190)

$\overline{\text{COMINT}}$

-continued

| Multi-Protocol Communications Controller, 154–156, FIG. 6C ||| 
|---|---|---|
| IE1, IE2 ||| 
| IEI (+5 V, plus five volts) ||| 
| Output Line Designations (Board Com Bus 200) ||| 
| U12, FIG. 6C | U13, FIG. 6C | U14, FIG. 6C |
| TXDA | TXDC | TXDE |
| RXDA | RXDC | RXDE |
| $\overline{\text{TXCA}}$ | $\overline{\text{TXCC}}$ | $\overline{\text{TXCE}}$ |
| $\overline{\text{RXCA}}$ | $\overline{\text{RXCC}}$ | $\overline{\text{RXCE}}$ |
| $\overline{\text{DREGO}}$ |  |  |
| $\overline{\text{DTRA}}$ | $\overline{\text{DTRC}}$ | $\overline{\text{DTRE}}$ |
| $\overline{\text{RTSA}}$ | $\overline{\text{RTSC}}$ | $\overline{\text{RTSE}}$ |
| $\overline{\text{CTSA}}$ | $\overline{\text{CTSC}}$ | $\overline{\text{CTSE}}$ |
| $\overline{\text{DCDA}}$ | $\overline{\text{DCDC}}$ | $\overline{\text{DCDE}}$ |
| TXDB | TXDD | TXDF |
| RXDB | RXDD | RXDF |
| $\overline{\text{TXCB}}$ | $\overline{\text{TXCD}}$ | $\overline{\text{TXCF}}$ |
| $\overline{\text{RXCB}}$ | $\overline{\text{RXCD}}$ | $\overline{\text{RXCF}}$ |
| $\overline{\text{DREGI}}$ |  |  |
| $\overline{\text{DTRB}}$ | $\overline{\text{DTRD}}$ | $\overline{\text{DTRF}}$ |
| $\overline{\text{RTSB}}$ | $\overline{\text{RTSD}}$ | $\overline{\text{RTSF}}$ |
| $\overline{\text{CTSB}}$ | $\overline{\text{CTSD}}$ | $\overline{\text{CTSF}}$ |
| $\overline{\text{DCDB}}$ | $\overline{\text{DCDD}}$ | $\overline{\text{DCDF}}$ |
| Control Bus 170 ||| 
| Outputs of U37, FIG. 6B ||| 
| $\overline{\text{RAMCS}}$ ||| 
| $\overline{\text{COMCS0}}$, $\overline{\text{COMCS1}}$, $\overline{\text{DOMCS2}}$ COMRD, COMWR ||| 
| Outputs of U3, FIG. 6A ||| 
| $\overline{\text{UCS}}$ ||| 
| $\overline{\text{MCS3}}$ $\overline{\text{MCS2}}$ $\overline{\text{MCS1}}$ $\overline{\text{MCS0}}$ ||| 
| $\overline{\text{RD}}$ ||| 
| $\overline{\text{WR}}$ ||| 
| ALE ||| 
| RST0 ||| 
| $\overline{\text{PCS0}}$ $\overline{\text{PCS1}}$ $\overline{\text{PCS2}}$ ||| 
| Output of U36, FIG. 6B ||| 
| Pin 5 - $\overline{\text{INTARD}}$ ||| 
| Output of U2, FIG. 6B ||| 
| Pin 5 - $\overline{\text{WROLYD}}$ ||| 
| RAM Component 153, FIG. 6G ||| 
| Inputs from RAM Control Bus 210 ||| 
| U18–U33 $\overline{\text{RRD}}$ $\overline{\text{RWR}}$ ||| 
| U18–U33, respectively $\overline{\text{RCE0}}$ – $\overline{\text{RE015}}$, respectively ||| 
| Inputs from Address Bus 180 ||| 
| A0–A12, RA13, A14 ||| 
| Outputs to RAM Data Bus 220 ||| 
| RDB0–RDB7 |||

Channel A Circuitry, FIG. 6E, is typical of each of the channels, and conductor designations for channel A are as follows:

| Channel A ||
|---|---|
| Conductors of Channel A Bus ||
| TXD12A    RXCAIN    TXD5A ||
|                                DTR5A ||
| DTR12A    $\overline{\text{RXDIA}}$    RTS5A ||
|                                TXC5A ||
| RTS12A    $\overline{\text{TXCAIN}}$ ||
| TXC12A ||
| Conductors of Jack Com Bus 230 ||
| TXDA | RTSA |
| RXDA | TXCA |
| DTRA | RXCA |
| Conductors of Board Com Bus 200 ||
| TXDA | $\overline{\text{RTSA}}$ |
| $\overline{\text{DTRA}}$ | $\overline{\text{TXCA}}$ |

| Available Channel A Jumper Connections, FIG. 6E |||
|---|---|---|
| TXD12A | to | TXDA, or |
| TXD5A | to | TXDA, or |
| TX485 | to | TXDA |
| RX485 | to | RXDA, or |
| $\overline{\text{RXDIA}}$ | to | $\overline{\text{RXDA}}$ |
| DTR12A | to | DTRA, or |
| DTR5A | to | DTRA |
| RTS12A | to | RTSA, or |
| RTS5A | to | RTSA, or |
| +5 V (plus five volts) | to | RTSA |
| COMCLK | to | $\overline{\text{TXCA}}$, or |
| $\overline{\text{TXCAIN}}$ | to | $\overline{\text{TXCA}}$ |
| TXC5A | to | TXCA, or |
| TXC12A | to | TXCA, or |
| +12 V (plus twelve volts) | to | TXCA |
| RXCAIN | to | RXCA, or |
| −12 V (minus twelve volts) | to | RXCA |

FIG. 6E

As shown in FIG. 6E, the channel A interface means 241 includes a jumper component JP1 capable of customizing the interface for operation under various communication standards. For example, conductors TX485 and RX485 are associated with outputs of component U1 and lead to pins five and seven of jumper component JP1. Thus, components JP1–JP5 can each be adapted to the RS-485 high speed differential TTL communication standard, enabling two of the multiple device communications controller units to be coupled as indicated at 250 in FIG. 7. As another example, channel A, for example, can be linked to a modem 260, FIG. 7, as indicated at 261A. The modem 260 may couple each of the controller units 271 and 272 with a telephone line such as indicated at 273 in FIG. 7. Other channels of the units 271 and 272 may be connected to up to nine data sources such as those previously mentioned. By way of example, channel F of unit 272 may be connected to a fiber optic interface 280, and a fiber optic line 281 may connect with a further device data source. Depending on need, the additional controller unit 272 can be of the same design as the main controller 271 or can be optimized for different needs. This optimization can be in the use of different microprocessors, multiple microprocessors, number of ports, etc. The standard RS-485 serial interface and programmability allow the easy connection of non-similar devices.

Figure 7:
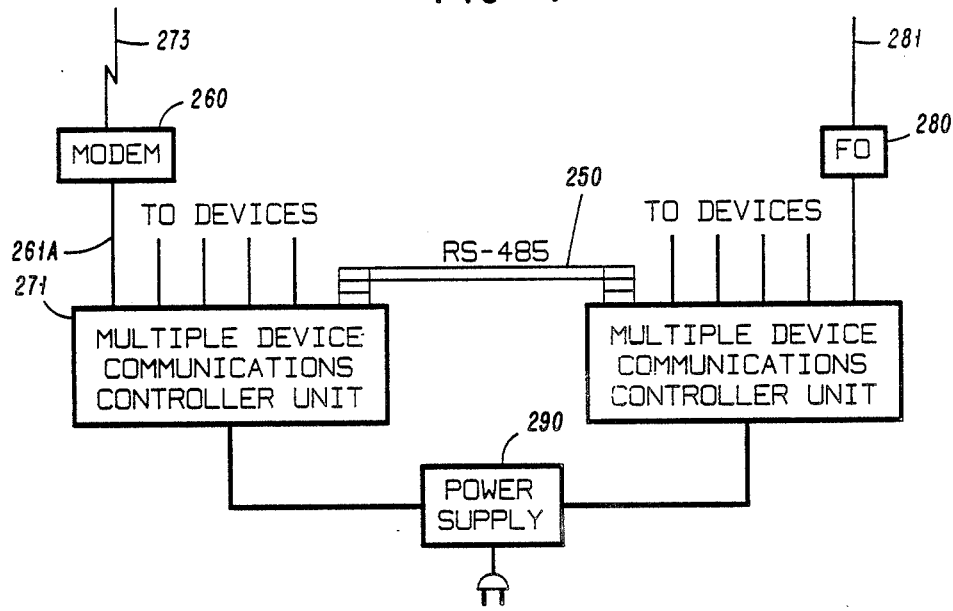
FIG. 7 is a block diagram showing the manner in which the embodiment of FIGS. 2-5 and 6A-6J can be expanded to accommodate further devices at a store location.

A power supply, as indicated at 290, FIG. 7, is operated from a standard AC outlet and is preferably in a separate package from the housing of unit 271 and from the housing of unit 272. The power supply 290 as shown may operate up to two controller units.

For versatility, the modem 260 is preferably packaged separately from the main communications unit housing of unit 271. In this way, the design or implementation of the communications unit 271 or of the modem 260 is not dictated by the other. An asynchronous auto-dial interface capability may be utilized for coupling with a switched telephone line, in which case modem 260 would be a switched network modem.

The fiber optic interface 280 is provided for connection to devices where the routing of electrical cables (RS-232) is prohibitive or difficult. This capability is extremely advantageous for the simple and inexpensive installation of devices in existing stores without requiring major modifications.

Some of the features of the system as illustrated in FIG. 7 are as follows:

Six channels with RS-232C or other optional interfaces

Software programmable protocols (Async., Byte Sync., or Bit Sync.)

Software programmable baud rates 128K to 512K non-volatile CMOS RAM

32K EPROM with diagnostics, bootstrap, and system level programs 80188 processor (16 MHZ crystal speed)

Layered multi-tasking operating system

Software loadable channel programs

Remotely programmable in a high level language

Complete hardware diagnostics available from local or remote locations

Expandable to fifteen devices using RS-485 standard bus interface

Figure 8:
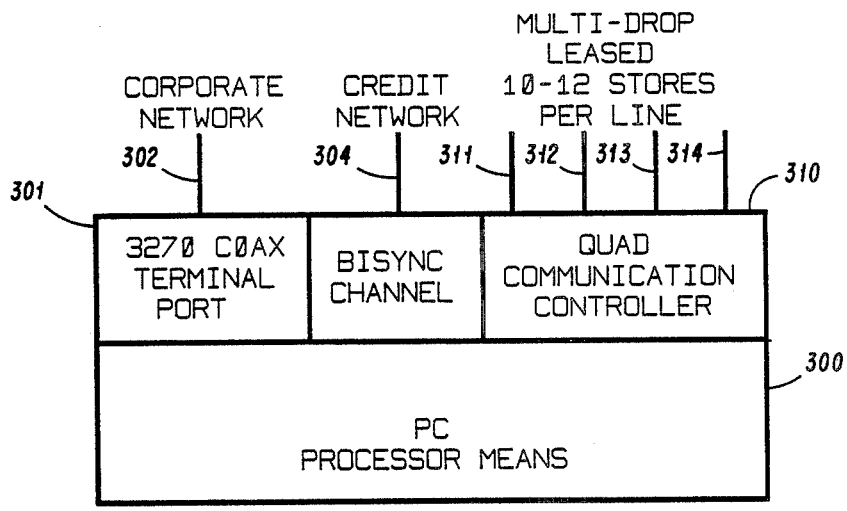
FIG. 8 illustrates a preferred processing configuration for a central site in a system such as illustrated in FIG. 3.

FIG. 8 illustrates an exemplary processing system for a central site such as indicated at 30 in FIG. 3. In FIG. 8, processing means 300 is shown as having a coaxial terminal port 301 for coupling with a corporate network line 302, a bisync channel 303 for communication with a credit network line 304 and a quad communication controller 310 for coupling with telephone lines such as indicated at 311-314. For example, lines 311-314 may be multi-drop leased lines each connecting with ten to twelve stores. The processor means 300 may be a PC-AT type with expansion capabilities. The primary function of the district system such as indicated in FIG. 8 is to communicate with the stores in a district or region, communicate to a corporate host network, communicate to a credit network, and execute local applications for video rental, check verification, and future needs.

A preferred communication protocol between the stores and the processing means 300 is an IBM Advanced Program to Program Communication (LU 6.2). This is a SDLC/SNA protocol that offers peer to peer communications between dissimilar devices. This implementation allows communication to most existing and future IBM processors. It provides a common communication protocol that allows multiple conversations between applications.

Figure 9:
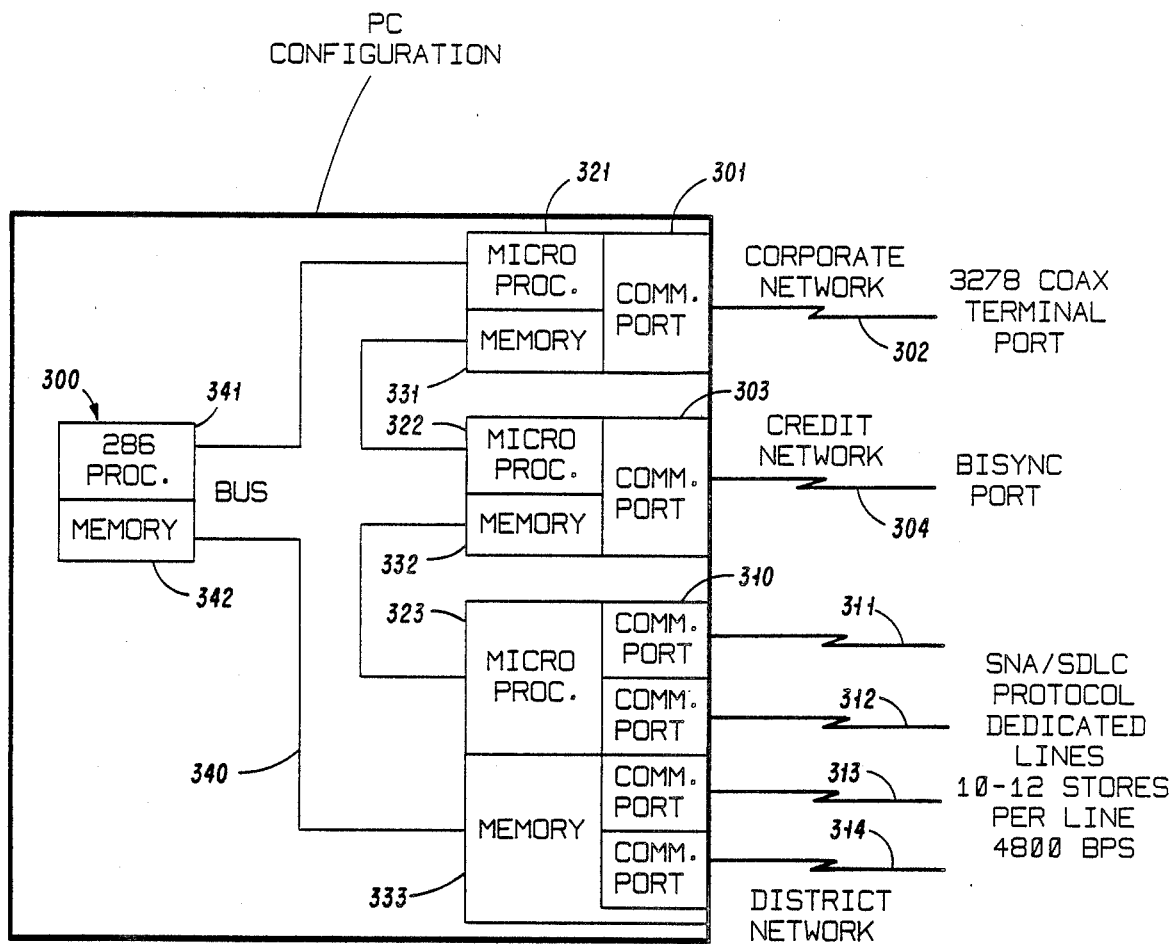
FIG. 9 illustrates a preferred detailed implementation for the embodiment of FIG. 8.

As indicated in FIG. 9, components 301, 303 and 310 may include respective microprocessors 321-323 with respective associated memory 331-333 all coupled with the main processor means 300 via a bus 340. This configuration off loads the tedious communication tasks from the main 80286 PC-AT processor 341 and greatly enhances the operation of processor 341 for application tasks such as data base handling, data routing and switching, etc.

The co-processor front end 323 is an 80188 device that can handle leased line multi-point communications to forty to fifty stores at up to 9600 bits per second per port. The commonality of design between the processors 300 and 323, and the communications controller units such as 271 and 272 facilitates implementation of the system.

The credit network interface 303 may be a leased line or dial-up co-processor interface board operating under a Bisync protocol. The communication to the host corporate network is through a 3270 co-processsor port emulating a 3278 with a coaxial connection to a terminal controller. A significant benefit of the arrangement of FIG. 9 is the coprocessor devices 321-323 each executing the communication tasks locally. The off-loading of the communications task from the main processor 341 allows for increased system performance.

Figure 10:
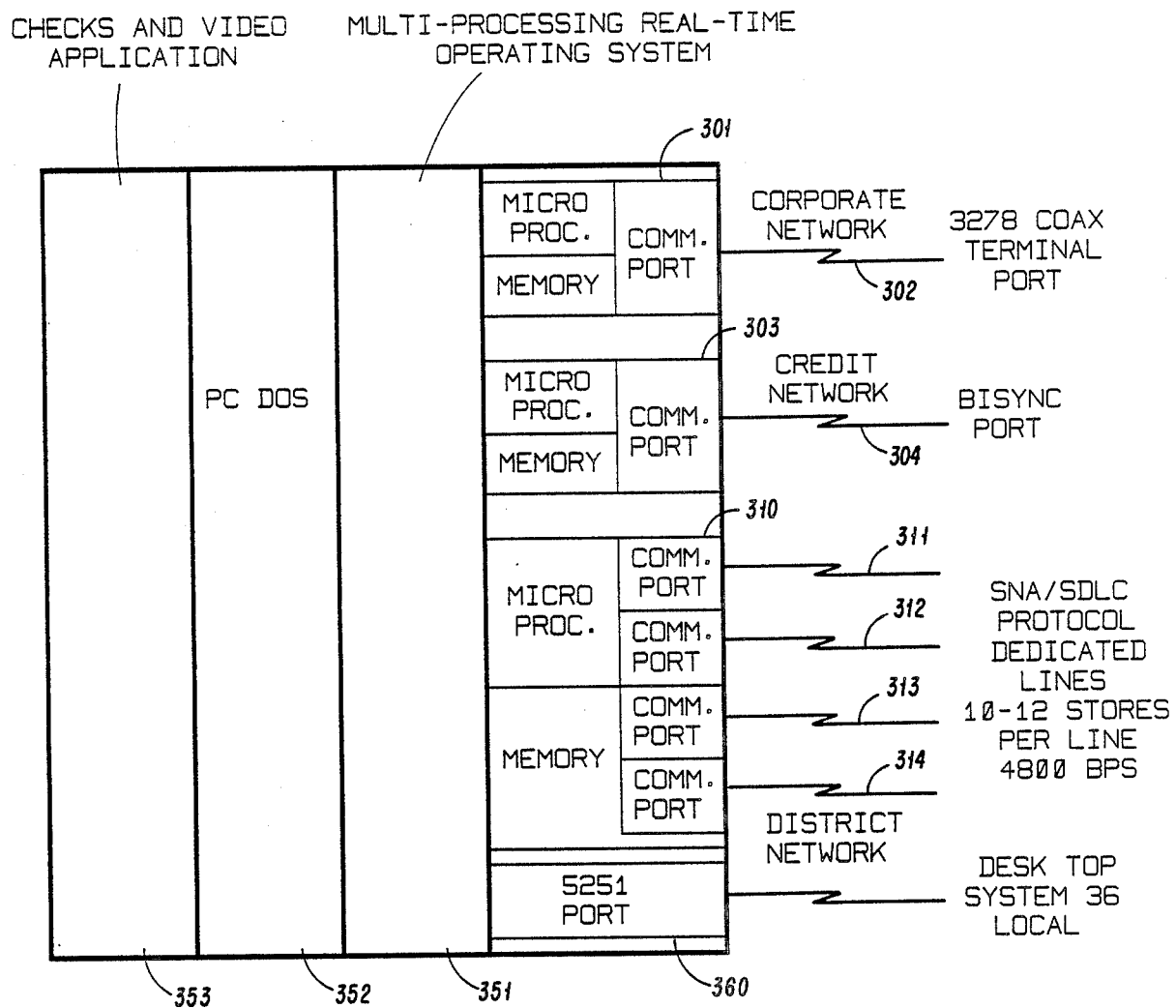
FIG. 10 is a diagrammatic illustration useful for explaining the embodiment of FIGS. 8 and 9.

As indicated in FIG. 10, memory 342 of the processing means 300 may include a multi-processing real-time operating system 351, a PC disk operating system 352 and check and video rental application programming 353. The system of FIG. 10 may further include a 5251 port 360 such that a desk top System 36 could be added when the need arises. In this case, processor 300, FIG. 9, would serve as the communication front-end to the System 36 operating in the LU 6.2 SDLC/SNA environment.

It will be apparent that many modifications and variations may be effected without departing from the scope of the novel concepts and teachings of the present invention.

We claims as our invention:

1. In a store data communications system wherein at a store location multiple different types of devices comprised of at least three different types of devices selected from the group consisting of an automatic teller device, a credit/debit authorization terminal, a point of sale terminal, a fuel volume sensing device, and a video rental terminal, are to be coupled with remote processing means, coupling means coupling such multiple different types of devices with a single communications line for coupling of the devices with remote processing means, said coupling means comprising a multiple device communications unit having respective device interface means for local coupling with respective ones of said multiple different types of devices, device interface buffer memory means for storing device data from each of said devices, and said multiple device communications unit having main channel interface means coupled with each of the device interface means and said device interface buffer memory means for assembling data from each of the device interface buffer memory means and for transmitting the assembled data utilizing a common protocol via a single communications line to a remote processing means.

2. In a system according to claim 1, said multiple device communications unit having modem means for coupling with a multi-drop leased telephone line.

3. In a system according to claim 1, said multiple device communications unit having modem means for coupling with a switched telephone network.

4. In a system according to claim 1, said multiple device communications unit comprising
processor means having remotely programmable storage means for storing system parameters and for receiving new system parameters from a remote processing means via one of said device interface means.

5. In a system according to claim 1, said main channel interface means comprising a plurality of multi-protocol communications controllers each coupled with a plurality of said device interface means.

6. In a system according to claim 1, said multiple device communications unit comprising
a housing having receptacles for the respective device interface means such that respective different device interface means for accepting data from respective different devices with respective different communications parameters are selectively insertable into the respective receptacles for adapting the communications unit for operation with any of multiple different data sources.

7. In a system according to claim 6, said receptacles receiving the respective device interface means with a snap-in action.

8. In a system according to claim 1, said multiple device communications unit having device interface means providing fiber optic coupling with one of said multiple devices.

9. In a system according to claim 1, said multiple device communications unit having a further device interface means providing a communications link for coupling with a single telephone line and having another device interface means for providing a communications link with another multiple device communications unit at the same store locations to expand the number of such multiple devices which may be coupled with the single telephone line.

10. In a centralized data communications system, a central station having coupling means for
coupling with a corporate network, a credit/debit network, and a local processing system,
said central station having microprocessor means and respective central communications port means, and said microprocessor means controlling communication between said coupling means and the respective central communications port means, and
a plurality of multiple device communications units each communicating with one of said central communications port means via a single telephone line,
each of said multiple device communications units being located at a separate store location and having respective removable and replaceable device interface units customized to communicate with respective disparate data sources at the store location.

11. In a centralized data communications system according to claim 10,
each of said multiple device communications units being capable of selectively receiving an interconnecting link capable of coupling such communications unit with an additional one of said units for expansion of the number of data sources to be coupled with a single telephone line at a respective store location.

12. In a centralized data communications system according to claim 10,
at least one of said multiple device communications units having device interface means with fiber optic communication with a data source of the associated store location 13. In a centralized data communications system according to claim 10,
at least one of the multiple device interface units having device interface means with a modem for communication with a multi-drop leased telephone line.

14. In a centralized data communications system according to claim 10,
at least one of the multiple device interface units having device interface means with a modem for communication with a switched telephone network.

15. In a data communications system,
a multiple device communications controller unit having a series of device interfaces each capable of coupling with a data source, and
main channel means having memory means storing data for each of said device interfaces, and having programmable multiple protocol controller means for assembling data from said memory means substantially as it arrives from said device interfaces, and for transmitting assembled data via a single telephone line to a remote station, said multiple protocol controller means being programmable to accommodate device interfaces operating with a plurality of different communications standards.

16. In a data communication system according to claim 15,
said multiple device communications controller unit having a further device interface providing for data coupling between the main channel means and a single telephone line.

17. In a data communication system according to claim 15,
said multiple device communications controller unit having a fiber optic coupler connected with at least one of said device interfaces for coupling with an optical communications line.

18. In a data communications system according to claim 15,
one of said device interfaces providing for coupling with a device interface of a second multiple device communications controller unit for coupling of further data sources with a single telephone line via said main channel means.

19. In a data communications system according to claim 15,
said device interfaces being capable of being customized for the interchange of data with respective data sources utilizing respective disparate communications standards, and said main channel means having respective programmable protocol conversion units respectively programmable to accommodate the respective disparate communications standards.

20. In a data communications system according to claim 15, said controller unit having snap-in connection with each of said device interfaces.

* * * * *